United States Patent
Jyojiki

[11] Patent Number: 5,796,421
[45] Date of Patent: Aug. 18, 1998

[54] POSITIONING APPARATUS FOR AN OPTICAL ELEMENT IN THE FORM OF A THIN FILM AND A SCANNING APPARATUS

[75] Inventor: Masao Jyojiki, Tokyo, Japan

[73] Assignee: Asahi Kogaku Kogyo Kabushiki Kaisha, Tokyo, Japan

[21] Appl. No.: 659,958

[22] Filed: Jun. 7, 1996

Related U.S. Application Data

[63] Continuation of Ser. No. 288,798, Aug. 12, 1994, abandoned.

[30] Foreign Application Priority Data

Aug. 13, 1993 [JP] Japan ................... 5-201574
Aug. 23, 1993 [JP] Japan ................... 5-207492

[51] Int. Cl.⁶ .................. B41J 2/47; G01D 15/34; G02B 26/00; G02B 27/00
[52] U.S. Cl. .................. 347/257; 347/134
[58] Field of Search .................. 346/136; 347/257, 347/241, 134

[56] References Cited

U.S. PATENT DOCUMENTS

| | | | |
|---|---|---|---|
| 3,657,710 | 4/1972 | Billawala | 360/103 |
| 4,428,069 | 1/1984 | Hazel et al. | 347/241 |
| 4,666,315 | 5/1987 | Scranton | 384/99 |
| 4,814,799 | 3/1989 | Lu | 347/241 |
| 4,906,081 | 3/1990 | Yasuda | 347/134 |
| 5,043,621 | 8/1991 | Culp | 310/316 |
| 5,124,829 | 6/1992 | Ishikawa | 347/241 |

OTHER PUBLICATIONS

*Fluid Film Lubrication*, by William A. Gross et al., Chapter 4, Sections 4 through 4-6 (pp. 157-241), pp. 56-95.

*Primary Examiner*—Benjamin R. Fuller
*Assistant Examiner*—Raquel Yvette Gordon
*Attorney, Agent, or Firm*—Greenblum & Bernstein P.L.C.

[57] ABSTRACT

A positioning apparatus of an optical element in the form of a thin film includes at least one positioning element having a surface opposed to the optical element without contacting the same, together with a mechanism for moving at least one of the optical element or the positioning element, in a direction parallel to a plane of the thin film. The opposed surface of the positioning element produces a fluid force when relative movement between the optical element and the opposed surface of the positioning element occurs and serves to hold the thin film at a predetermined position. An optical scanner incorporating such a positioning apparatus is also disclosed.

37 Claims, 24 Drawing Sheets

POSITIONING APPARATUS FOR AN OPTICAL ELEMENT IN THE FORM OF A THIN FILM AND A SCANNING APPARATUS

This application is a continuation, of application Ser. No. 08/288,798, filed Aug. 12, 1994, now abandoned.

BACKGROUND OF THE INVENTION

1. Field of the Invention

The present invention relates to a positioning apparatus for an optical element in the form of a thin film. The present invention further relates to a scanning apparatus using an optical element in the form of a thin film, which can be generally applied to a laser printer, a POS system, a surface flaw detector, and various measuring apparatuses.

2. Description of Related Art

An optical element in the form of a thin film which is used in a diffraction grating, a micro Fresnel lens, a hologram disc, etc., exhibits better optical properties, e.g., converging efficiency or the scanning efficiency (deflection efficiency), than an optical element, such as a lens, a prism, or a mirror, etc., which is made of metal, glass or plastic. In addition, the optical element in the form of a thin film can be easily and inexpensively produced. Therefore recently, optical scanners, such as scanners for a POS system to a laser printer a laser leveler, have been developed and marketed using holograms or diffraction lenses in the form of a thin film.

However, in such optical instruments incorporating an optical element in the form of a thin film, it is difficult to correctly position the optical element due to the delicate form of the thin film. For instance, a hologram disc in the form of a thin film is bonded to a reinforcing glass plate to provide and ensure the flatness of the hologram disc to thereby prevent a change in the deflection point of the hologram disc. However, such as measure increases the manufacturing cost, and accordingly, the advantage of the hologram disc being less expensive than a polygonal mirror is lost.

In a conventional hologram disc apparatus, a plurality of hologram facets are radially arranged on a single rotatable disc of polycarbonate having a thickness of 1 to 2 mm, to reduce the manufacturing cost thereof. The rotary disc is rotated by a motor. Even with a thickness of 1 to 2 mm, in practice there is a displacement of about 300 μm in a deflection point of light, due to the change in the environmental state of the hologram disc (particularly, a change in the temperature), a strain caused by a gradual disappearance of a residual stress caused upon molding (particularly, a deformation of the polycarbonate disc influenced by the direction of gravity during the forming of the polycarbonate disc), or a loose fit of the rotary shaft (particularly a play in the thrust direction), etc. For example, to achieve approximately 600 dpi for an optical scanner in a printer wherein the deflection angle of light by the hologram disc is 90°, it is necessary to limit the displacement of the deflection point caused by the above-mentioned causes to less than 42.3 μm.

However, in order to precisely control the deflection point, it is necessary not only to produce an accurately dimensioned rotary shaft, (to i.e., to ensure a precise rotation of the motor and the hologram disc), but also to prevent the hologram disc from being deformed. However, this makes the hologram scanner expensive.

Furthermore, in a conventional optomagnetic disc apparatus, in which an optomagnetic disc provided on a substrate of polycarbonate with a thickness of 1 to 2 mm is rotated, a focusing servo-mechanism is essential to compensate for insufficient flatness of the substrate. In theory, no focusing servo-mechanism is necessary if it is ensured that the surface of the hologram disc has a perfect flatness and the hologram disc rotates within a single plane.

Since light has substantially no mass, it is theoretically not necessary for the optical scanner to be rigid, stiff or strong enough to support a fluid, powder or solid medium to be conveyed. Nevertheless, in practice, in a printer in which a bundle of rays is converged to draw image data, a CD player in which fine marks (bits) are read, an optomagnetic disc apparatus, a bar-code reader, or an optical scanner for an optical meter of a measuring instrument in which a fine flaw or size is detected, it is necessary to position and move a light deflecting disc with a high degree of precision in order to keep constant the focal point and/or the density of the scanning beams. For instance, a light deflecting disc in the form of a sheet, such as a hologram disc or Fresnel lens, can be easily mass-produced (reproduced) by a stamping process. The light deflecting sheet has optical properties as good as those of a lens, prism or mirror made of a glass, plastic or aluminium. However, But, it is difficult to position or adjust the light deflecting sheet at a correct position due to the flexibility thereof. Consequently, it is definitely necessary to provide a reinforcing member to which the light deflecting sheet is attached.

SUMMARY OF THE INVENTION

The primary object of the present invention is to provide an apparatus which holds an optical element in the form of a thin film within a fixed a plane and in a defined position.

Another object of the present invention is to provide a mechanism for eliminating the elements in known devices which are necessary to correct focussing serves, i.e., servo-focussing elements.

Another object of the present invention is to provide a positioning mechanism for thin film elements which does not have a backing structure.

Another object of the present invention is to provide an optical scanner in which a light deflecting disc in the form of a thin film can be used without a reinforcing member or substrate.

Still another object of the present invention is to provide an optical scanner, in which a rotatable mirror having multiple mirror surfaces is made of a light deflecting disc in the form of a thin film.

The basic concept of the present invention resides in the utilization of a fluid force to retain an optical element in the form of a thin film within a fixed plane.

According to an aspect of the present invention, there is provided a positioning apparatus for an optical element in the form of a thin film, which includes at least one positioning element having a surface opposed to the optical element without contacting the same, and a moving mechanism for moving at least one of the optical element and/or the opposed surface of the positioning element, in a direction parallel with a plane of the thin film. The opposed surface of the positioning element defines a positioning surface which produces a fluid force when the relative movement between the optical element and the opposed surface of the positioning element takes place and thus holds the thin film at a predetermined position.

According to another aspect of the present invention, there is provided an optical scanner which includes a light deflecting disc in the form of a thin film. The deflecting disc has an annular track on the front and back surfaces, and is rotatable about an axis perpendicular to the plane of the light deflecting disc. A pair of positioning elements face the annular track surfaces so as to produce a fluid force between the positioning elements and the track surfaces when the light deflecting disc is rotated.

The light deflecting disc (optical element) in the form of a thin film can be made of, for example, a rotatable multi-mirror and provided on a peripheral surface thereof with a plurality of reflecting surfaces, or a hologram disc provided with a plurality of hologram facets divided in the circumferential direction thereof.

The annular track surfaces can be provided at any position of the front and back surfaces of the multi-mirror. For the hologram disc, a pair of inner and outer annular track surfaces can be concentrically provided on inner and outer sides of the hologram facets.

Preferably, one of the positioning elements is provided with a contact portion which comes into contact with the annular track surfaces to support the light deflecting disc within a plane. The contact portion contributes to damping or restricting any oscillation of the light deflecting disc that may occur due to damage or manufacturing errors in the disc.

An additional feature can be provided where, the annular track surfaces of the light deflecting disc are separate from the light deflecting portion of the light deflecting disc. However, if a relatively coarse positioning of the thin film is accepted, or if the moving speed of the disc is high and there is a certain magnification of air pressure, etc., the annular track surfaces can be defined by the light deflecting portion of the light deflecting disc.

Still another feature of the present invention is to provide an optical recording and reproducing apparatus which does not require a focusing device. Namely, according to still another aspect of the present invention, an optical recording and reproducing apparatus is provided which includes an optical element in a form of a thin film without a backing structure a recording and reproducing mechanism which records information onto the thin film and reproduces the information using a laser light to be focused onto the thin film, and at least one positioning element having a surface opposed to the optical element without contacting the same. A moving device for moving at least one of the optical element or the opposed surface of the positioning element in a direction parallel with a plane of the thin film is also provided. With these features this apparatus has eliminated the focusing mechanism which known devices require to compensate for their focusing errors. Since the present apparatus does not create such focusing errors.

The present disclosure relates to subject matter contained in Japanese patent application Nos. 5-201574 (filed on Aug. 13, 1993) and 5-207492 (field on Aug. 23, 1993) which are expressly incorporated herein by reference in their entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
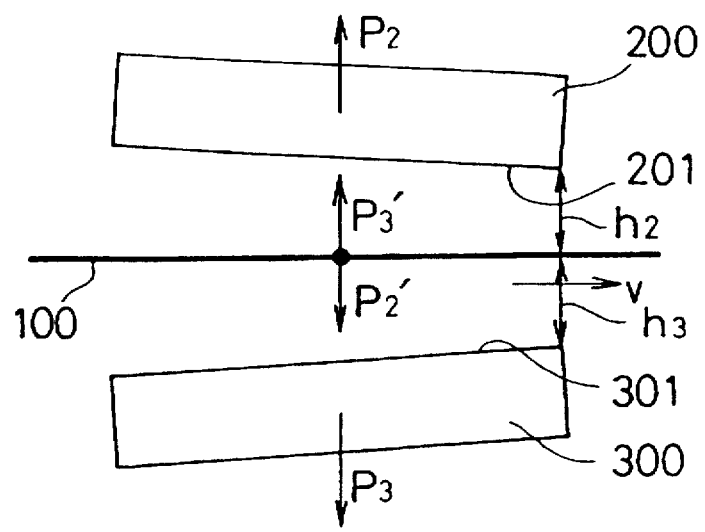
FIG. 1 is an explanatory view showing the principle of a positioning apparatus of an optical element in the form of a thin film, according to the present invention.
Figure 2:
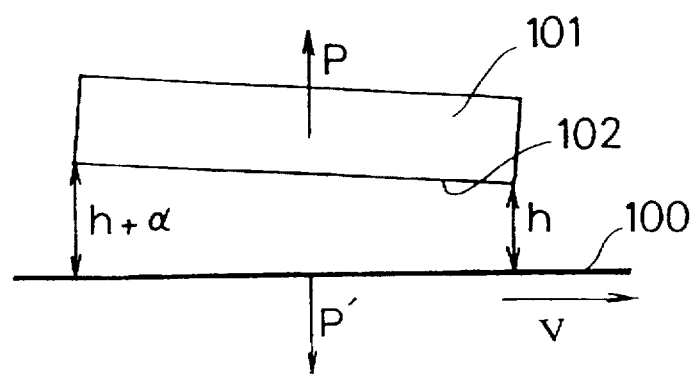
FIG. 2 is a schematic view of a relationship of a force produced between a moving flat surface and a wedge opposed thereto, in prior art.

The principle of the present invention will be discussed below with reference to FIG. 1, in comparison with a conventional positioning apparatus as described for example in "FLUID FILM LUBRICATION" (William A. Gross, et al.) published by Wiley Interscience as shown in FIG. 2. It is assumed, in FIG. 2, that there is a fixed object 101 located above and in the vicinity of a surface 100 moving at a velocity V. The object 101 is provided with an oblique surface 102 inclined with respect to the moving surface 100 and opposed to the latter. The inclination direction of the oblique surface 102 is such that the distance between the oblique surface 102 and the moving surface 100 decreases toward the front end of the oblique surface as viewed in the direction of the movement of the moving surface 100. Namely, the distance between the oblique surface 102 and the moving surface 100 changes from "(h+α)" distance between the oblique surface 102 and the moving surface 100 at the Rear end) to "h"(=distance between the oblique surface 102 and the moving surface 100 at the front end). In this assumption, as is well known, forces P and P' that are substantially in inverse proportion to "h" and in proportion to "α" difference between "h+α" and "h") and "V2" are produced between the moving surface 100 and the object 101.

The basic concept of the present invention is based on this phenomenon. As can be seen in FIG. 1, there are a pair of fixed objects 200 and 300 having oblique surfaces 201 and 301 respectively on opposite sides (upper and lower sides) of the moving surface 100 moving at velocity "v". There is only one point at which the force P2' produced by the moving surface 100 and the oblique surface 201 is identical to the force P3' produced by the moving surface 100 and the oblique surface 301. If the moving surface 100 comes close to the oblique surface 201, the force P2' increases and the force P3' decreases. Conversely, if the moving surface 100 comes close to the oblique surface 301, the force P3' increases and the force P2' decreases. Consequently, the moving surface 100 is held within a plane between the oblique surfaces 201 and 301 by the fluid force. The distance h2 and h3 are not necessarily identical to each other. Also, the inclination angles of the oblique surfaces 201 and 301 are not necessarily identical. The oblique surfaces 201 and 301 can be either flat surfaces or cylindrical surfaces.

Figure 3:
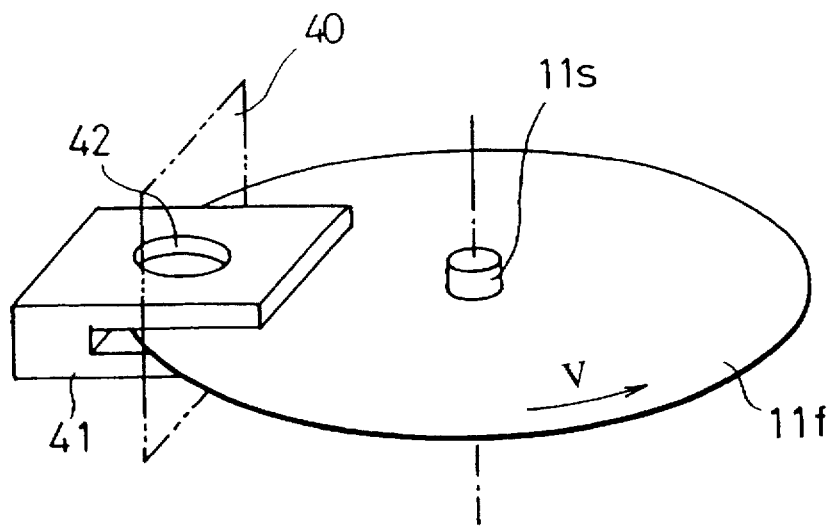
FIG. 3 is a perspective view of a positioning apparatus applied to a hologram disc, according to the present invention.
Figure 4:
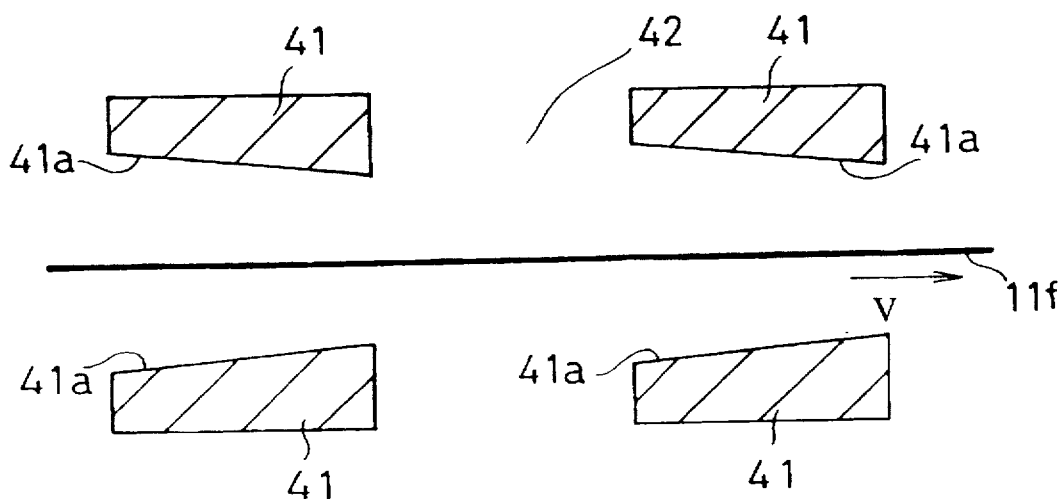
FIG. 4 is a sectional view taken along an imaginary plane 40 shown in FIG. 3 according to the present invention.

FIGS. 3 and 4 show an optical element in the form of a thin film, e.g., a hologram disc 11f to which the present invention is applied. A pair of positioning elements 41 are provided above and below the hologram disc 11f. The positioning elements 41 are interconnected at one end thereof, so that they form a generally U-shape in cross section. The positioning elements 41 are provided with through holes 42 through which laser beams pass.

In FIG. 4 which is a sectional view of the positioning elements 41 taken along an imaginary plane 40 (FIG. 3) in the tangential direction of the optical film element 11f. In FIG. 4, the optical film element 11f is deemed to be a thin film which linearly moves from the left direction toward the right direction. The upper and lower positioning elements 41 are provided with oblique surfaces 41a that are inclined with respect to the optical film element 11f, so that the distance between the oblique surfaces 41a and the optical film element 11f decreases toward the front end thereof (right end in FIG. 4). In the illustrated embodiment, the oblique surfaces 41a on the right and left sides of the through holes 42 are symmetrical with respect to the moving surface of the optical film element 11f.

With this arrangement, when the optical film element 11f rotates, the fluid force thereby produced around the oblique surfaces 41a precisely holds the optical film element 11f within a plane.

There are many different embodiments of the present invention, as follows.

Figure 5:
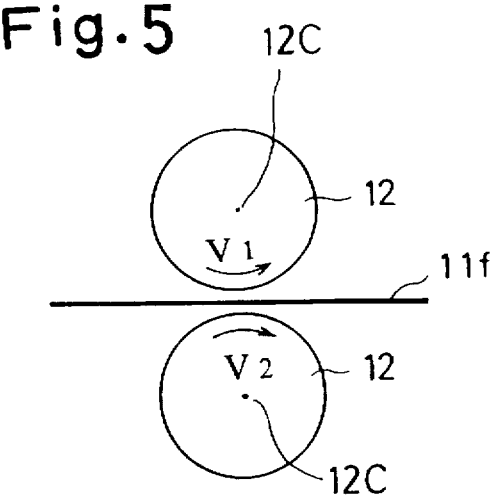
FIGS. 5 through 13 are schematic views of the positioning apparatus according to different embodiments of the present invention.

In an embodiment illustrated in FIG. 5, there are a pair of rotatable cylinders 12 on the upper and lower sides of the optical film element 11f. The rotatable cylinders 12 are rotatable about respective shafts 12C which extend in planes parallel with the optical film element 11f. In this embodiment, when the rotatable cylinders 12 are rotated, the surfaces thereof opposed to the optical film element 11f are moved in a direction (tangential direction) parallel with the plane of the optical film element 11f. Consequently, fluid forces are produced between the optical film element 11f and the upper and lower rotatable cylinders 12, so that the optical film element 11f can be held at a position at which the fluid forces are balanced. The optical film element 11f is either stationary or rotatable.

Figure 6:
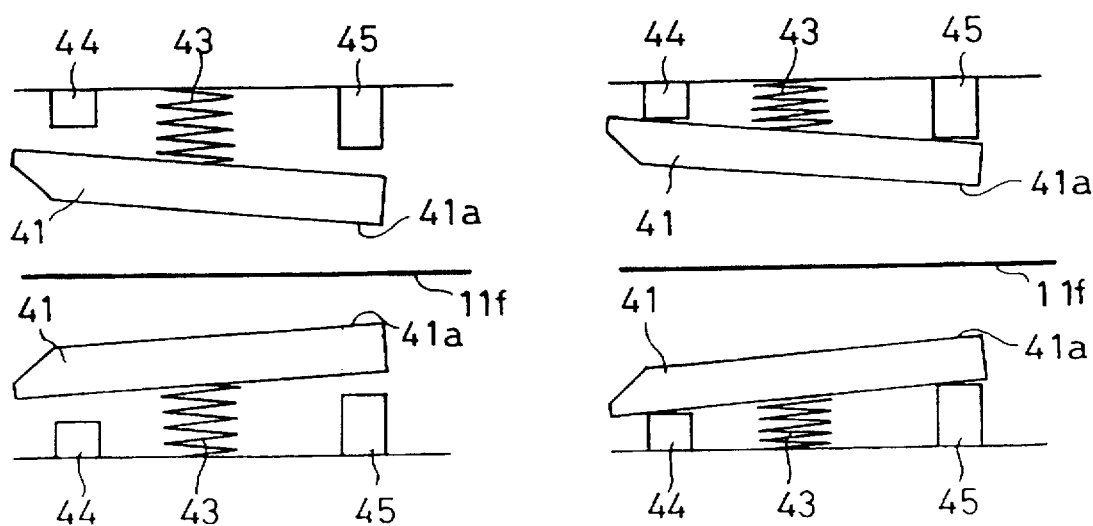

In an embodiment illustrated in FIG. 6, the distance between the optical film element 11f and the upper and lower positioning elements 41 is automatically varied depending on the speed of the movement of the optical element 11f. The positioning elements 41 are biased by compression springs 43 toward the optical element 11f so as not to come into contact therewith. When the fluid forces are increased by an increase in the speed of the optical element 11f, the positioning elements 41 are moved outward by the increased fluid forces while compressing the compression springs 43. The maximum displacement of the positioning elements 41 is restricted by stops 44 and 45. The oblique surfaces 41a of the positioning element 41 are inclined with respect to the optical film element 11f, so that the distance between the oblique surfaces 41a and the optical film element 11f decreases toward the front end thereof (right end in FIG. 6). In the illustrated embodiment, when the speed of the optical film element 11f increases, the distance between the oblique surfaces 41a and the optical film element 11f increases, and accordingly, the latter can be held within a plane, regardless of the speed of the movement thereof.

Figure 7:
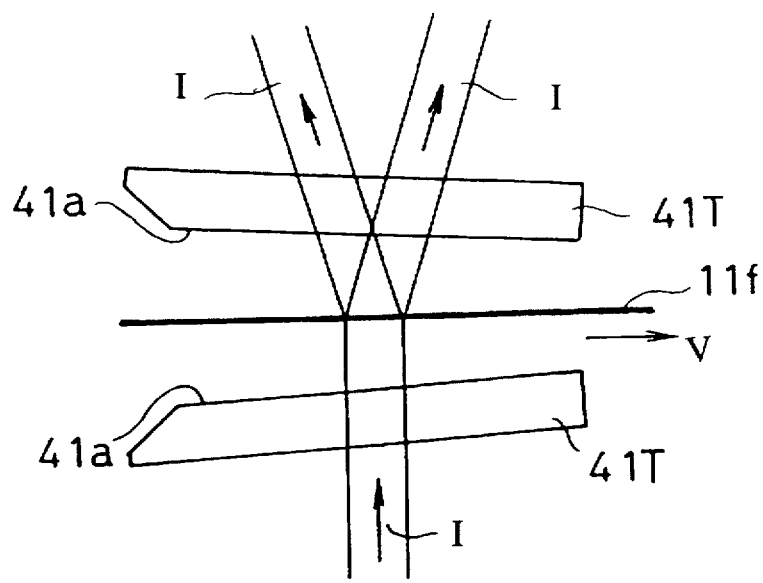

In an embodiment illustrated in FIG. 7, the upper and lower positioning elements 41T provided on the both sides of the optical element 11f are made of a transparent material. In the case that the optical element 11f is a hologram disc, the scanning beam I deflected by the hologram disc 11f can be emitted through the upper positioning element 41T.

Figure 8:
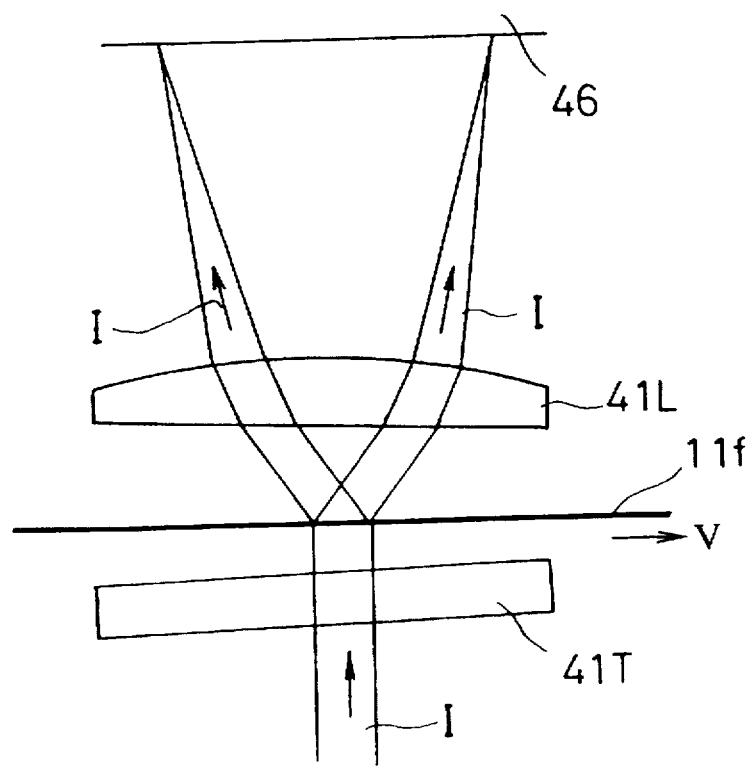

In an embodiment illustrated in FIG. 8, one of the upper and lower positioning elements provided on both sides of the optical element 11f is made of a lens. In the illustrated embodiment, the upper positioning element 41L is made of an f θ lens, and the lower positioning element 41T is made of a cylindrical lens. The scanning laser beam I deflected by the hologram disc 11f can be transmitted through the fθ lens (upper positioning element) 41T and made incident upon a photosensitive drum 46.

Figure 9:
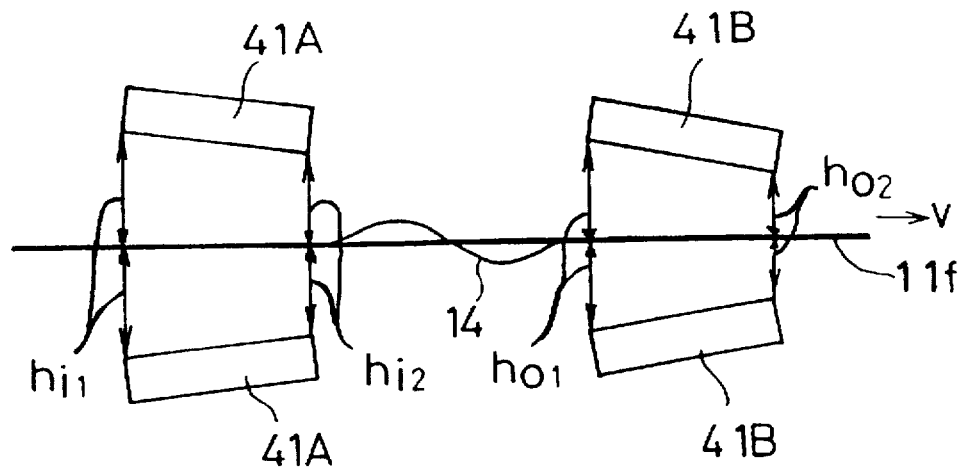

In an embodiment illustrated in FIG. 9, there are two pairs of positioning elements 41 (41A, 41B) provided on both sides of the optical element 11f. In this case where more than one pair of positioning elements 41A and 41B are provided, the distances hi1 and hi2 between the rear positioning element (left positioning element in FIG. 9) 41A and the optical film element 11f are preferably 1 larger than the corresponding distances ho1 and ho2 between the front positioning element (right positioning element in FIG. 9) 41B and the optical film element 11f, respectively. This makes it possible to roughly position the optical film element 11f with the rear pair of positioning elements 41A and to precisely position the same with the front pair of positioning elements 41B.

In accordance with the purpose of use, it is also possible to make the distances ho1 and ho2 larger than the corresponding distances hi1 and hi2. In this alternative, the air resistance caused in the passage defined by the distances ho1 and ho2 is smaller than the air resistance caused in the passage defined by the distances hi1 and hi2, so that there is no fear that the optical film element 11f is wrinkled as indicated at, 14, in FIG. 9.

Figure 10:
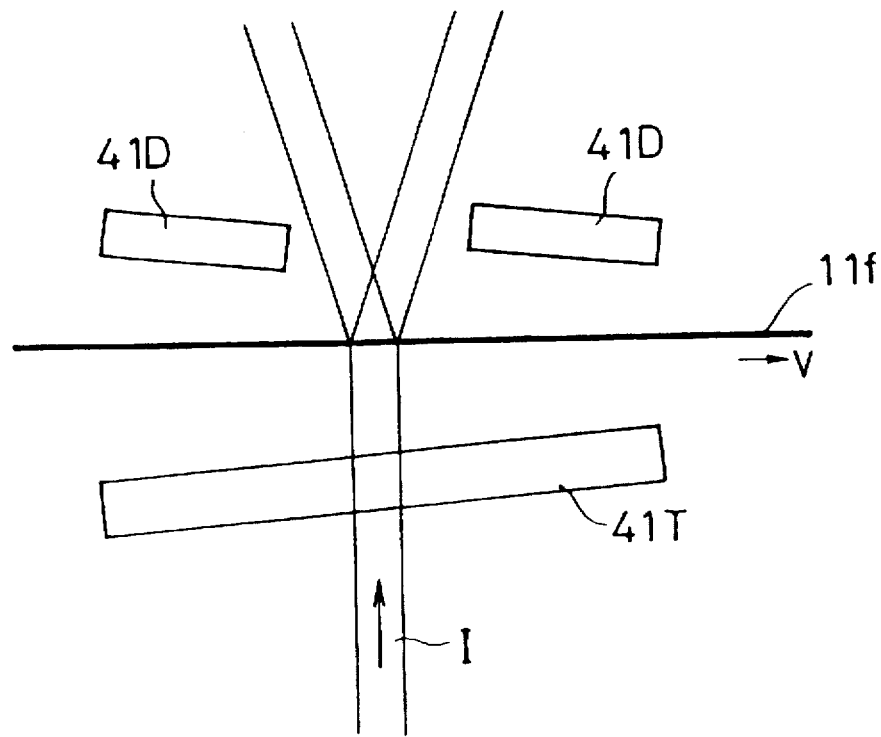

In an embodiment illustrated in FIG. 10, there are 15 two split upper positioning elements 41D above the optical element 11f, and one lower positioning element 41T (made of a transparent material) below the optical element 11f. The beams I can be emitted through a space defined between the upper positioning elements 41D.

Figure 11:
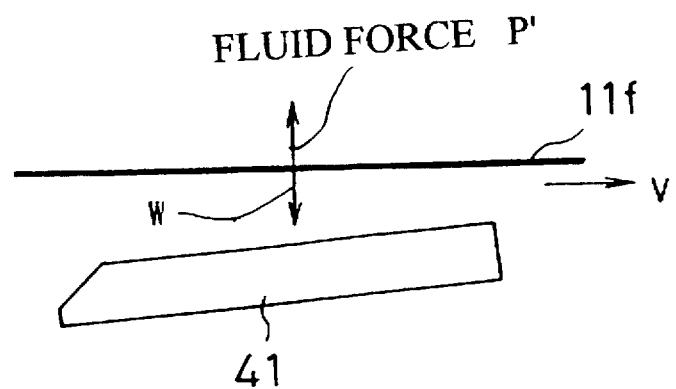
Figure 12:
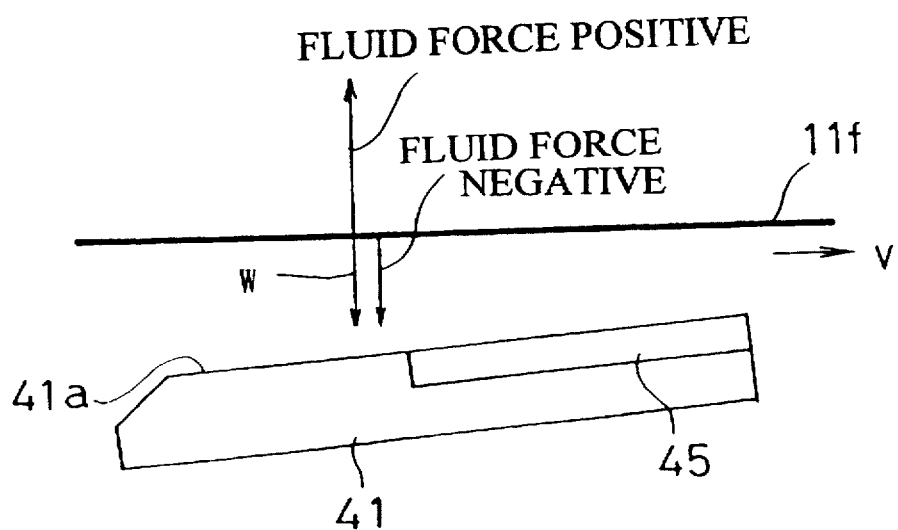
Figure 13:
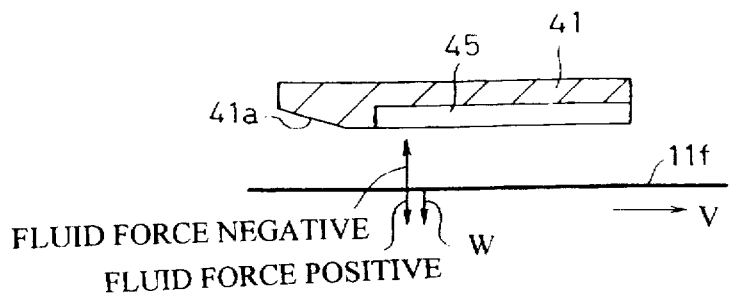

It is possible to provide only one positioning element to hold the optical film element 11f within a plane, as shown in FIGS. 11 through 13.

In an embodiment illustrated in FIG. 11, there is only one positioning element 41 below the optical film element 11f. In this embodiment, the optical film element 11f is held at a position in which the weight W (mass gravity) acting on the optical film element 11f and the fluid force (positive pressure) P' produced by the movement of the optical film element 11f are balanced.

In an embodiment illustrated in FIG. 12, there is only one positioning element 41 below the optical film element 11f, similar to FIG. 11. The positioning element 41 is provided on the center portion of the oblique surface 41a thereof with a shallow groove 45. Since a negative pressure is produced in the groove 45 to suck the optical film element 11f downward, the optical film element 11f is held at a position in which the positive pressure (upward force) produced by the oblique surface 41a and the sum of the weight W (mass×gravity) of the optical film element 11f and the negative pressure produced by the groove 45 are balanced.

In an embodiment illustrated in FIG. 13, there is only one positioning element 41 above the optical film element 11f. The positioning element 41 is provided on the center portion of the oblique surface 41a thereof with a shallow groove 45. A negative pressure is produced in the groove 45 which tends to suck the optical film element 11f upward, the optical film element 11f is held at a position in which the negative pressure (upward force) produced by the groove 45 and the the weight W (mass×gravity) of the optical film element 11f and the positive pressure produced by the oblique surface 41a in the downward are balanced.

Figure 14:
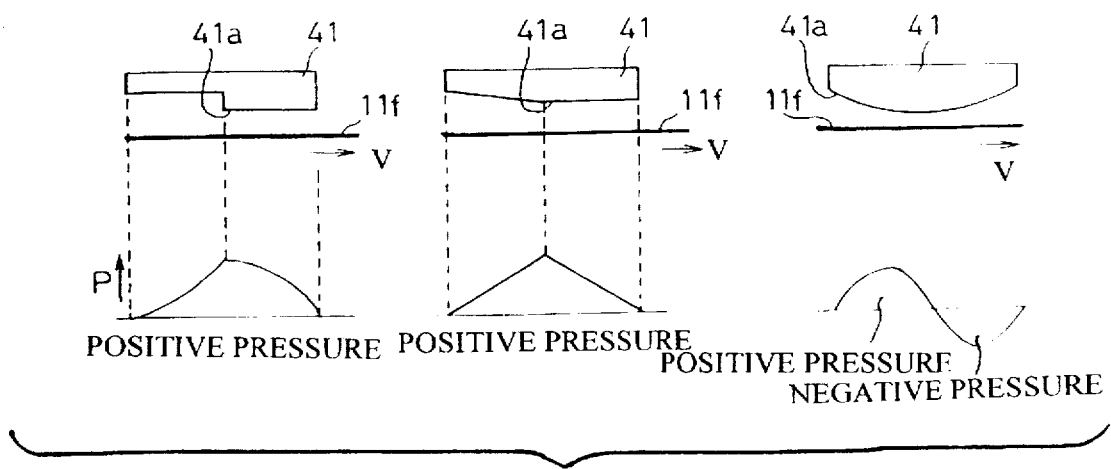
FIGS. 14 and 15 are explanatory views of a fluid force produced between a positioning element and an optical element in the form of a thin film, depending on the shapes of the opposed surfaces thereof according to the present invention.

FIG. 14 shows a relationship between the shape of the positioning surface 41a and the pressure produced by the positioning surface 41a between the latter and the optical film element 11f, by way of example. As can be seen in FIG. 14, a positive pressure or a negative pressure is produced between the positioning surface 41a and the optical film element 11f, depending on the shape of the positioning surface 41a. Consequently, the shape, the position, and the number of the positioning elements 41 can be determined so as to hold the optical thin film element 11f within a plane with the help of the pressure (force).

Figure 15:
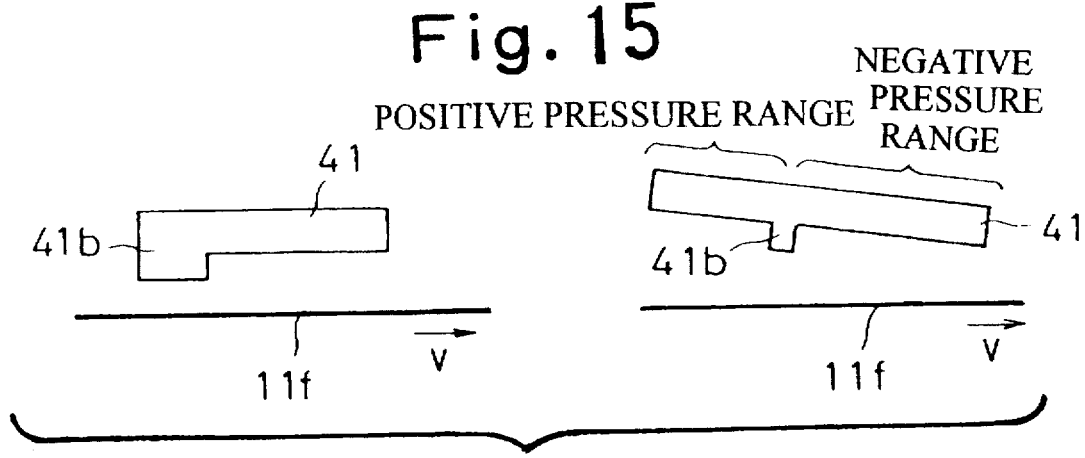

FIG. 15 shows two examples of positioning elements where a fluid force (pressure)is formed. In the first case, the positioning element 41 has a surface facing the optical thin film element 11f, with a projection (air stop) 41b. A negative pressure is produced behind the air stop 41b during the relative movement of the optical thin film element (or the positioning element). If the positioning element 41 has both a positive pressure portion and a negative pressure portion as in the second case the thin optical film element 11f can be held within a plane by only one positioning element.

Figure 16:
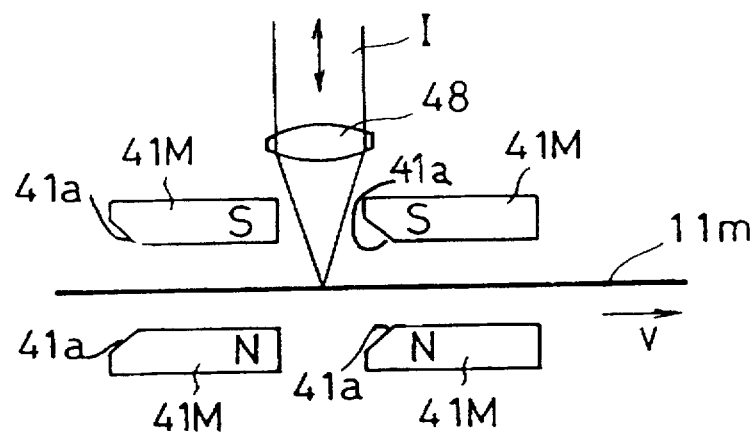
FIG. 16 is a schematic view of a positioning apparatus according to another embodiment of the present invention.
Figure 17:
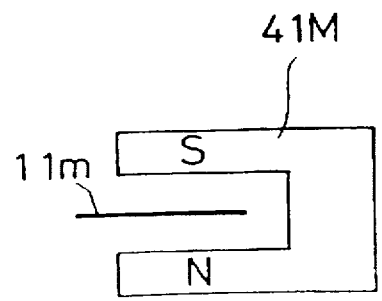
FIG. 17 is a side elevational view of FIG. 16.

As can be understood from the above discussion, according to the present invention, the optical element in the form of a thin film can be held with in a plane. Consequently, if the invention is applied to an optomagnetic disc apparatus, a focusing servo-mechanism can be dispensed with, as shown in FIGS. 16 and 17. In FIGS. 16 and 17, the optomagnetic disc 11m in the form of a thin film passes through a space defined between pairs of positioning elements 41M made of a magnet. The positioning magnetic elements 41M are each provided with an oblique 41a. The upper and lower positioning magnet elements 41M produce a magnetic field acting on the optomagnetic disc 11m, so that the writing laser beams I condensed by an objective lens 48 are made incident upon the optomagnetic disc 11m to write data. In the present invention, since the planar position of the optomagnetic disc 11m is precisely controlled, no focusing servo-mechanism is necessary.

Figure 18:
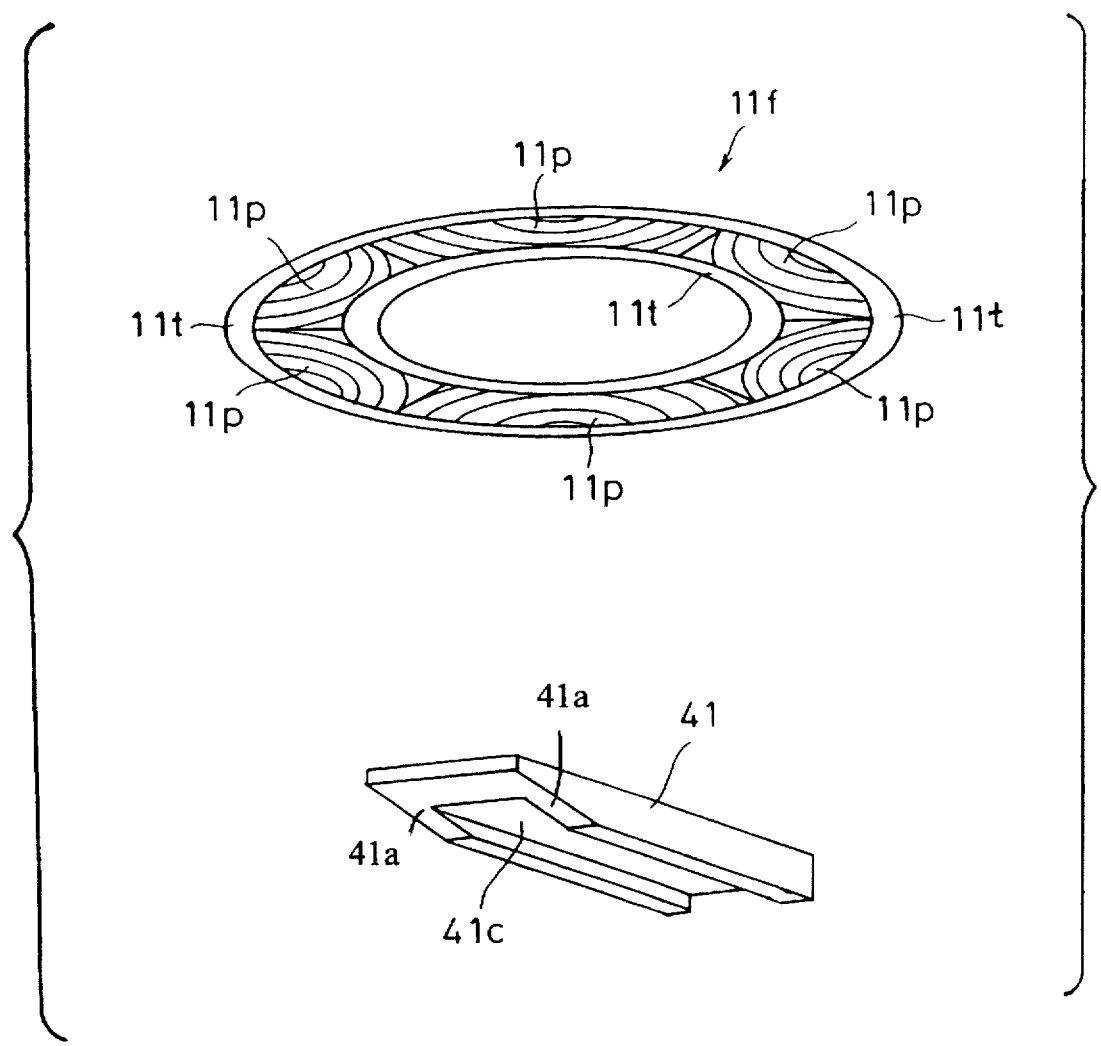
FIGS. 18 through 21 are schematic views of a positioning apparatus according to different embodiments of the present invention.

FIG. 18 shows another embodiment in which the optical thin film element 11f is provided with positioning tracks 11t, and the positioning element 41 is provided with oblique surfaces 41a opposed to the tracks 11t. Namely, the thin film element 11f, which is a hologram disc in the illustrated embodiment, is provided with hologram facets 11p between the inner and outer positioning tracks 11t. The portion of the positioning element 41 that is opposed to the hologram facets 11p is provided with a recess 41c so as not to interfere therewith. In this embodiment, the hologram facets 11p are prevented from being damaged.

Figure 19:
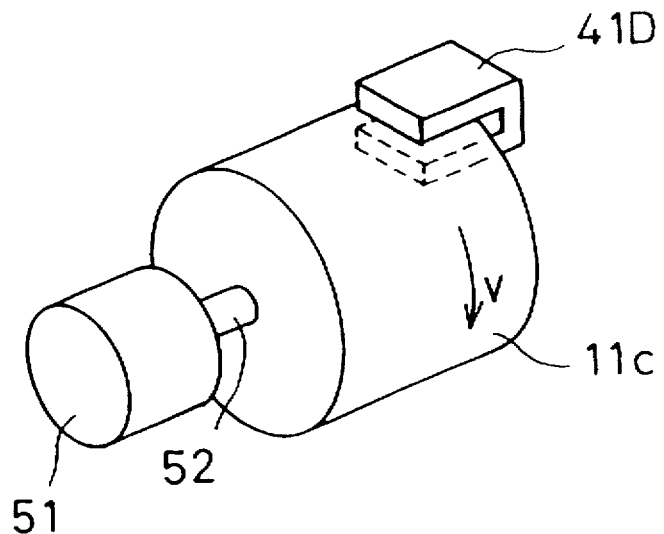

FIG. 19 shows an optical thin film element 11c in the form of a cylinder. The cylindrical thin film element 11c is coaxially connected to a drive shaft 52 of a motor 51. In this embodiment, the U-shaped positioning element 41D is positioned at one end of the cylindrical thin film element 11c, so that the the thin film element is inserted into the positioning element 41D.

Figure 20:
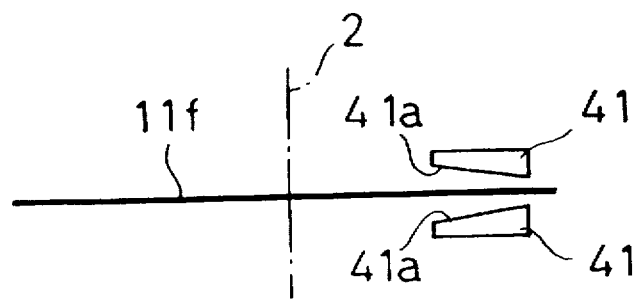

The direction of the arrangement of the positioning element is not limited to the circumferential direction of the optical thin film element which rotates. FIG. 20 shows another embodiment in which the positioning elements 41 are oriented to the centrifugal direction of the optical thin film element 11f which rotates about the shaft 2. Namely, a pair of positioning elements 41 between which the rotating optical element 11f is rotatably disposed have oblique surfaces 41a whose distance increases toward the shaft 2. In this embodiment, there are two air flows in the circumferential direction of the optical element 11f and in the centrifugal direction thereof, so that the optical element 11f can be held within a plane owing to the air flows.

Figure 21:
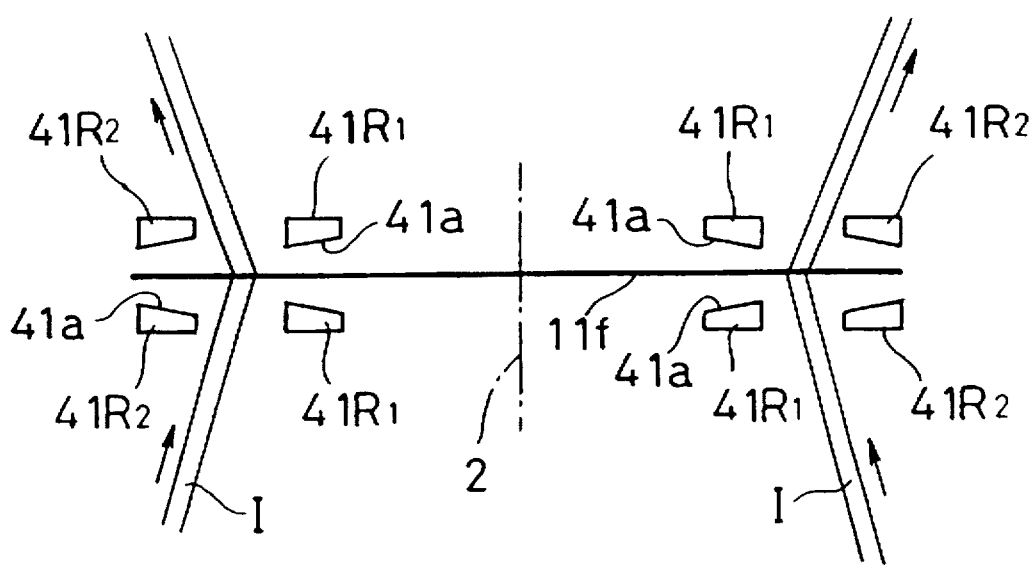

In an embodiment illustrated in FIG. 21, there are annular positioning elements 41 concentric to the optical element 11f which rotates about the shaft 2. Pairs of inner and outer annular positioning elements 41R1 and 41R2 are provided above and below the optical element (e.g., hologram disc) 11f which rotates about the shaft 2. The direction of the oblique surfaces 41a is identical to that of the oblique surface shown in FIG. 20. Namely, the distance between the oblique surfaces 41a increases toward the shaft 2. The scanning laser beams I are emitted through the space defined between the inner and outer positioning elements 41R1 and 41R2.

The fluid (air, etc.) flows in the centrifugal direction of the hologram disc 11f when the latter rotates, so that the fluid force acts on the positioning elements 41R1, and 41R2 and the hologram disc 11f. Consequently, the hologram disc 11f can be held at a correct position with respect to the positioning elements 41R1 and 41R2 by the fluid force.

With this arrangement, since the entire peripheral surface of the disc 11f is equally held, none or very little oscillation occurs. In addition, a plurality of bundles of scanning beams I can be emitted through the hologram disc 11f. According to this embodiment, an inexpensive and high efficiency POS terminal or a multi-beam printer can be obtained.

In the above-mentioned embodiments, although a hologram disc or an optomagnetic disc is used as the optical thin film element, the optical element in the form of a thin film is not limited thereto. FIGS. 22 through 27 show different examples of an optical element in the form of a thin film, which can be used in the present invention.

Figure 22:
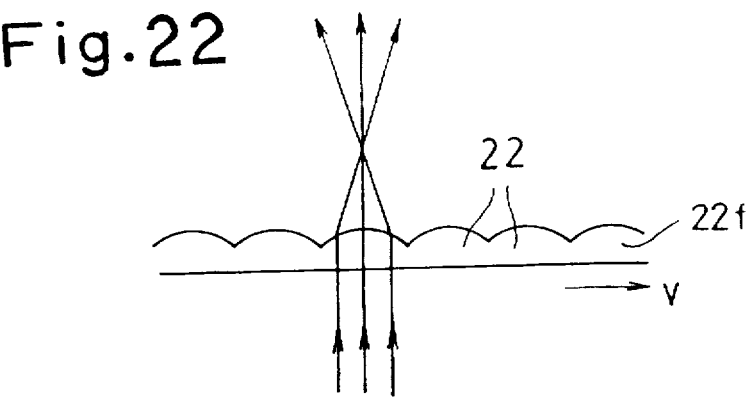
FIGS. 22 through 33 show examples of an optical element in the form of a thin film which can be used in a positioning apparatus according to the present invention.

FIG. 22 shows a convex lens element 22f in the form of a thin film, that is provided with a group of fine convex lenses 22 aligned in the direction of the movement thereof.

Figure 23:
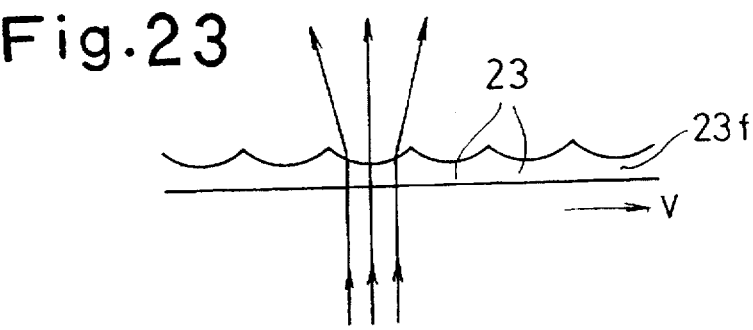

FIG. 23 shows a concave lens element 23f in the form of a thin film, that is provided with a group of fine concave lenses 23 aligned in the direction of the movement thereof.

Figure 24:
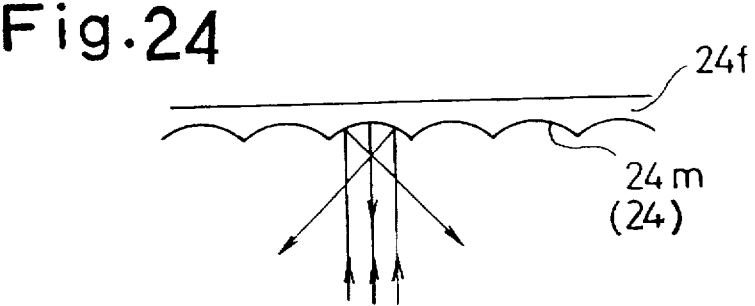

FIG. 24 shows a concave mirror element 24f in the form of a thin film, that is provided with a group of fine concave mirrors 24 aligned in the direction of the movement thereof. "24m" designates mirror surfaces.

Figure 25:
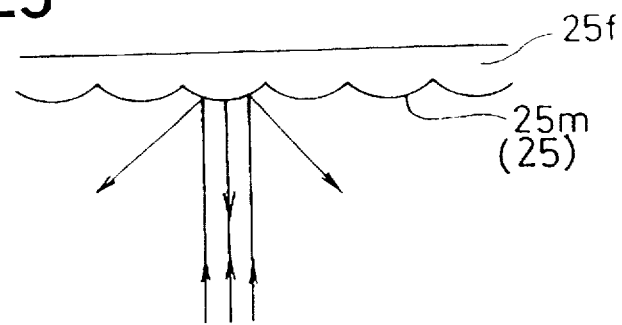

FIG. 25 shows a convex mirror element 25f in the form of a thin film, that is provided with a group of fine convex mirrors 25 aligned in the direction of the movement thereof. "25m" designates mirror surfaces.

Figure 26:
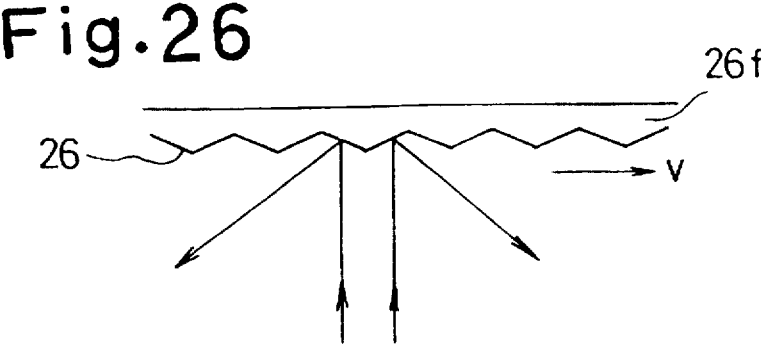

FIG. 26 shows a serrated reflecting surface element 26f in the form of a thin film, that is provided with a group of fine serrated reflecting surfaces 26 aligned in the direction of the movement thereof.

Figure 27:
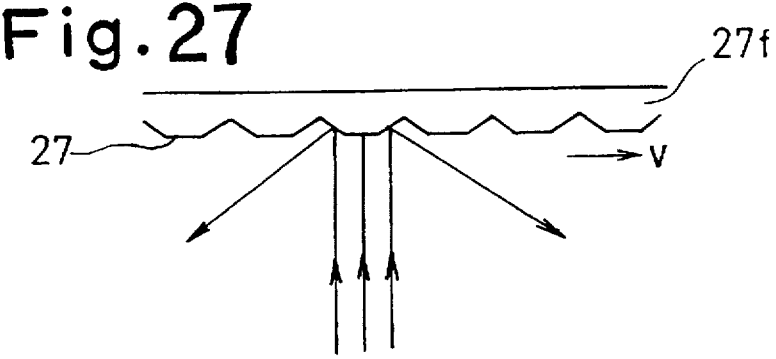

FIG. 27 shows a trapezoidal reflecting surface element 27f in the form of a thin film, that is provided with a group of fine trapezoidal reflecting surfaces 27 aligned in the direction of the movement thereof.

The optical thin film elements shown in FIGS. 22 through 27 can be used as a beam scanner for an image or the like. If the mirrors 24 in FIG. 24 comprise semi -transparent surfaces (half mirrors) 24m, the concave mirror thin film element 24f functions as a fine concave lens for the beams transmitted therethrough and a fine concave mirror for the beams reflected thereby. If the concave mirror element 24f is used as a beam scanner, two bundles of scanning beams having different scanning speeds (angular velocities), in which the oscillation is synchronized are obtained. Accordingly, this can be advantageously applied to a data reading and writing optical system having a function to enlarge and/or reduce an image size.

The same advantage as that of the embodiment illustrated in FIG. 24 can be expected from the embodiment illustrated in FIG. 25.

In case of a group of reflecting surfaces as shown in FIGS. 26 and 27, if the reflecting surfaces are made of a half mirror, the reflecting surface element 26f or 27f can be advantageously applied to an optical switch, an optical rotary encoder, or a laser gyro, etc., in which the reflected light and refracted light can be utilized. In addition, the optical elements shown in FIGS. 26 and 27 can be used as an optical switch to change an optical path.

FIGS. 28 through 32 show different examples of an optical thin film element which can be used in the present invention.

Figure 28:
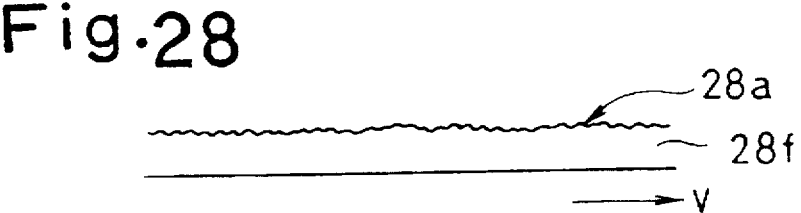
Figure 29:
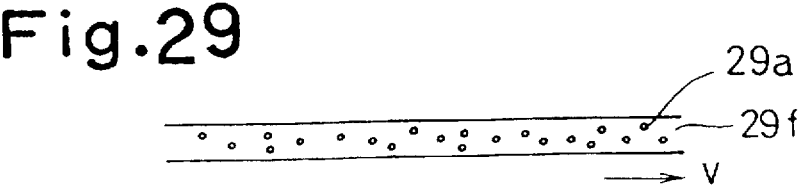

FIG. 28 shows a diffuser element 28f made of a thin film which is provided with a rough surface (uneven surface) 28a, and FIG. 29 shows a diffuser element 29f made of a thin film which is provided therein with optical impurities 29a. The diffuser element 28f or 29f can be used to erase a laser spectrum or remove a high frequency component of a spatial frequency, etc. Namely, in a laser display using laser light, in which a speckle pattern occurs, a deteriorated image quality results. However, if the diffuser element 28f or 29f is provided in the optical path so as to rotate, no speckle pattern occurs.

Figure 30:
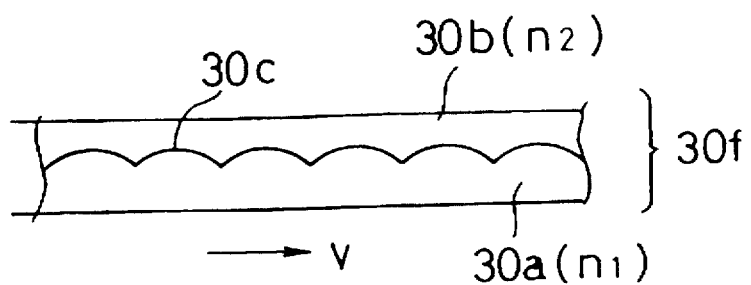

FIG. 30 shows a two-layer element 30f comprised of laminated transparent layers 30a and 30b having different refractive indexes n1 and n2. The transparent layers 30a and 30b are interconnected through a connecting surface of a group of slightly curved surfaces 30c. If n1>n2, the two-layer element 30f functions as a convex lens, and if n1<n2, the two layer element 30f functions as a concave lens.

Figure 31:
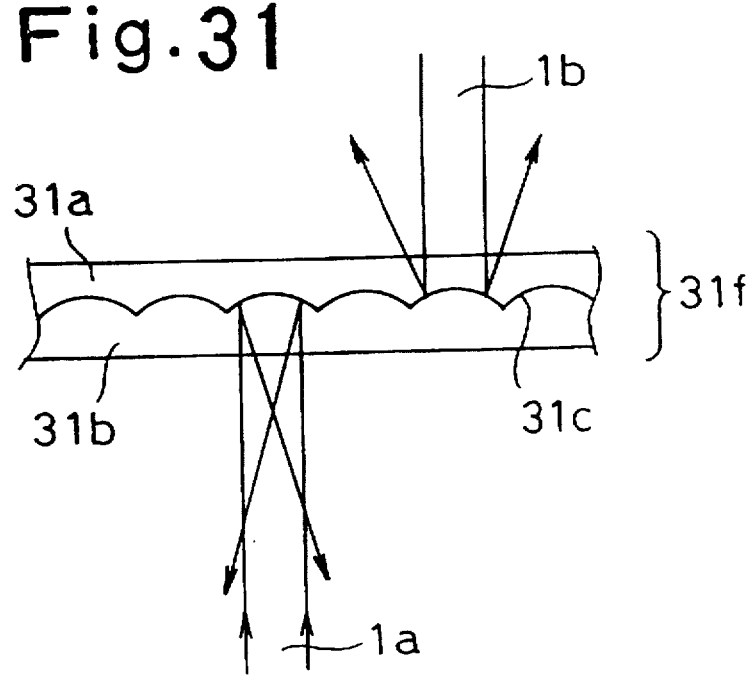

FIG. 31 shows a two-layer element 31f comprised of laminated transparent thin layers 31a and 31b which are connected through a reflecting surface 31c of a group of slightly curved surfaces. Depending on the direction of the incidence of light, the two-layer element 31f functions as a concave mirror (for a bundle of rays 1a), or a convex mirror (for a bundle of rays 1b).

Figure 32:
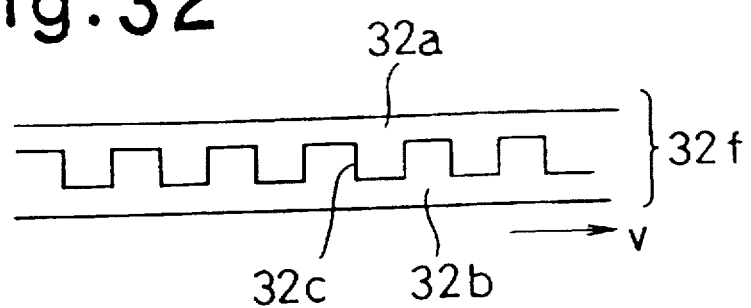

FIG. 32 shows a hologram diffraction element 32f comprised of laminated transparent thin layers 32a and 32b which are connected through a diffraction grating 32c.

Figure 33:
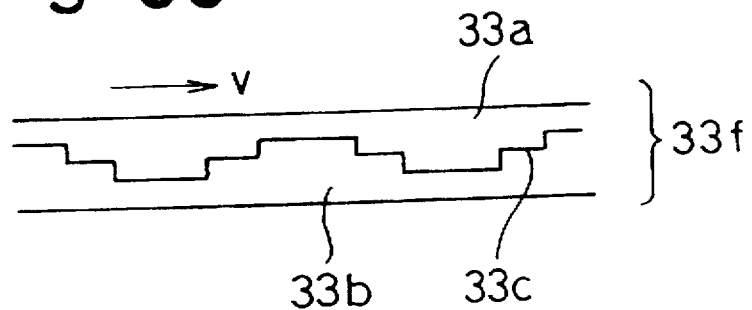

FIG. 33 shows a step type of phase difference element 33f comprised of laminated transparent thin layers 33a and 33b which are connected through a stepped diffraction grating 33c.

The optical thin films shown in FIGS. 29 through 32 can be used as a beam scanner.

The above-mentioned optical thin film elements to which a positioning apparatus of the present invention can be applied are not limited to those of the illustrated embodiments. The present invention can be of course applied to any kind of existing optical thin film element or optical thin film elements which will be developed in the future. For instance, the Fresnel lens which is usually made of a plastic thin film requires a reinforcing member to provide a certain degree of strength as previously described with respect to the prior art. However, according to the present invention, the Fresnel lens of a thin film can be used without such a reinforcing member.

Figure 34:
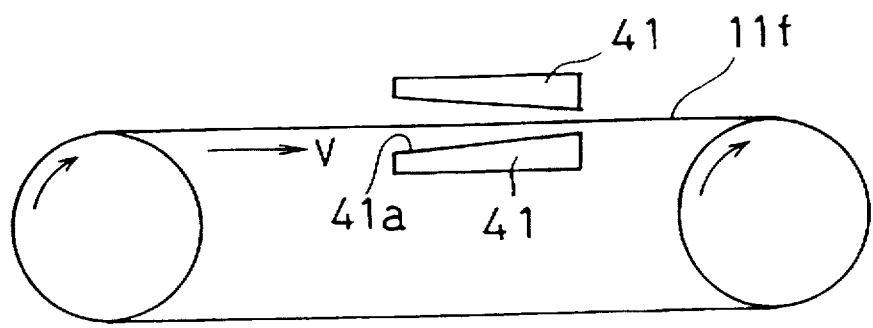
FIG. 34 is a front elevational view of a positioning apparatus applied to an endless belt type of an optical element in the form of a thin film, according to the present invention.
Figure 35:
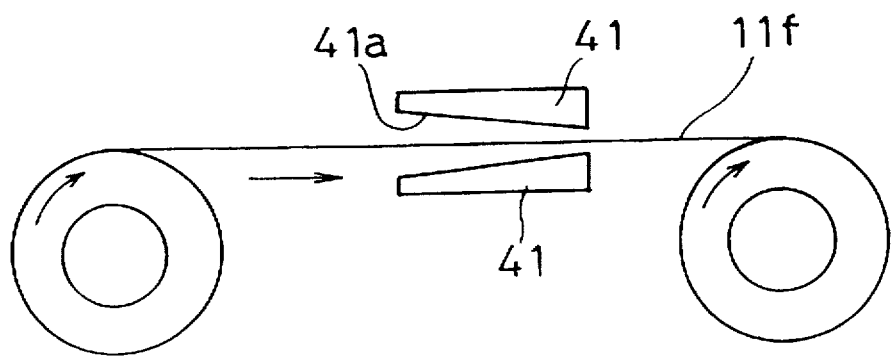
FIG. 35 is a front elevational view of a positioning apparatus applied to a winding belt type of an optical element in the form of a thin film, according to the present invention.

Although the optical thin film elements mentioned above are in the form of a rotary disc, the present invention is not limited to a disc and can be applied for example, to a tape or an endless belt type of thin film. FIG. 34 shows a hologram element 11f which is in the form of an endless belt. FIG. 35 shows a hologram element 11f which is in the form of a winding tape.

Figure 36:
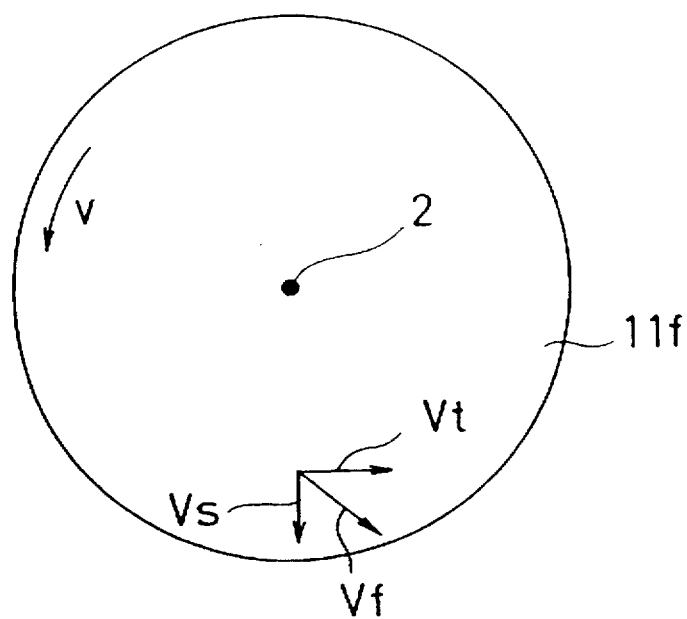
FIG. 36 is an explanatory view of an air flow above a rotary disc.
Figure 37:
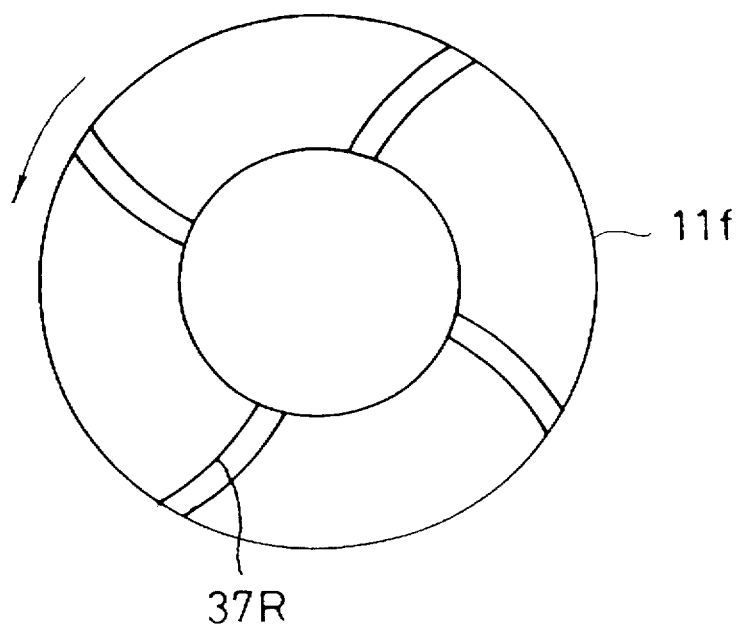
FIG. 37 is a schematic view of an optimum arrangement of oblique surfaces of positioning elements on a rotary disc, based on the analysis shown in FIG. 36.

There is no limitation to the direction of the arrangement of the oblique surface (positioning surface) 41a of the positioning element 41. FIG. 36 shows a rotary disc 11f which rotates in the counterclockwise direction, as viewed in the direction of the axis of the shaft 2. If the fluid flowing on the disc 11f has a viscosity such as air, there is a resultant flow Vf, of the flow Vs due to the centrifugal force and the flow Vt, in the direction of the rotation of the disc, as viewed from the side of a stationary system. Since the flows Vs and Vt are in proportion to the radius of rotation, the fluid flows spirally. Consequently, to obtain the maximum fluid force, the positioning elements 41 are located such that the direction of the oblique surfaces extends along the spiral lines 37R (FIG. 37). FIG. 37 shows four spiral lines 37R, but the number of the spiral lines can be less or more than four depending upon the purpose.

The following discussion will be directed to more concrete embodiments of the present invention.

Figure 38:
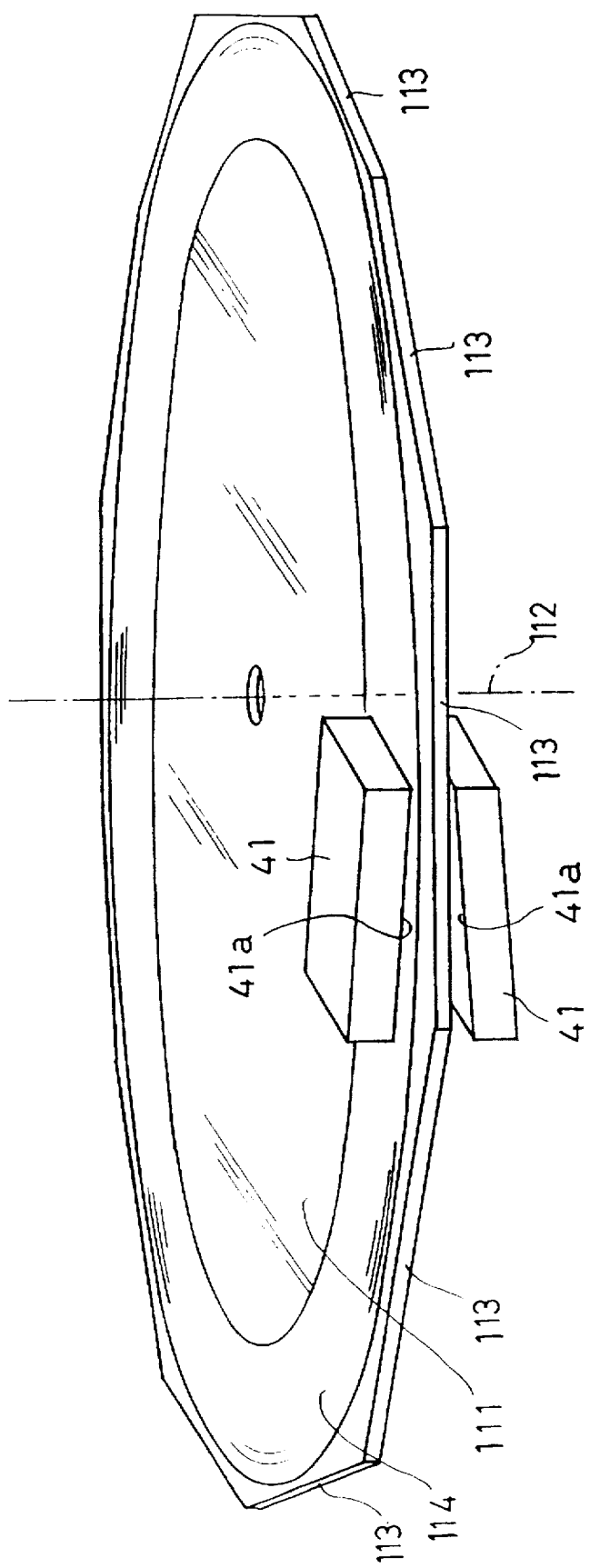
FIG. 38 is a perspective view of a rotatable multi-surface mirror of an optical scanner to which the present invention is applied.

FIG. 38 shows an embodiment in which the present invention is applied to a rotary multi-mirror (polygonal mirror) 111. The rotary mirror 111 is a beam deflecting disc made of a very pure aluminium thin film. The rotary mirror 111 is rotatable about a shaft 112. The rotary mirror 111 is provided on the peripheral surface thereof with a plurality of reflecting surfaces 113 spaced at an equal radial distance from the axis of the shaft 112. The rotary mirror 111 has on the front and back surfaces a flat and smooth annular track surfaces 114. A pair of positioning elements 41 are mounted facing the front and back track surfaces 114. The positioning elements 41 are provided with flat obliged surfaces 41a opposed to the annular track surfaces 114 and inclined (wedged) toward the leading end of the rotation of the rotary mirror 111 so that the distance between the oblique surfaces 41a of the positioning elements 41 and the corresponding annular track surfaces 114 of the rotary disc 111 gradually decreases. In other words, the distance between the oblique surfaces 41a of the positioning elements 41 and the corresponding annular track surfaces 114 gradually increases toward the rear end as viewed in the direction of rotation of the rotary mirror 111. The positioning elements 41 are immovably held by a stationary support (not shown).

When the rotary mirror 111 is rotated about the shaft 112, fluid force is produced between the front and back track surfaces 114 of the rotary mirror 111 and the corresponding oblique surfaces 41a of the positioning elements 41, as mentioned above. Consequently, the axial position of the rotary mirror 111 is fixed by the fluid force.

With the arrangement shown in FIG. 38, as mentioned above, an air pressure layer is formed between the annular track surfaces 114 of the rotary mirror 111 and the oblique surfaces 41a of the pair of positioning elements 41, so that the flatness of the rotary mirror 111 can be maintained due to the presence of the air pressure layer. The rotary mirror 111 which is in the form of a thin film and which does not have rigidity or stiffness sufficient to hold the same in the direction of the reflecting surfaces 113 can be positioned at a correct position by the positioning elements 41 which are held at a predetermined position, provided that the rotary mirror is strong enough to resist the centrifugal force and the air resistance. This leads to a reduction of a mounting error of the polygonal mirror (rotary mirror) and a reduction in deviation of the reflecting surfaces 113 during the rotation of the polygonal mirror by the driving motor thereof.

Figure 39:
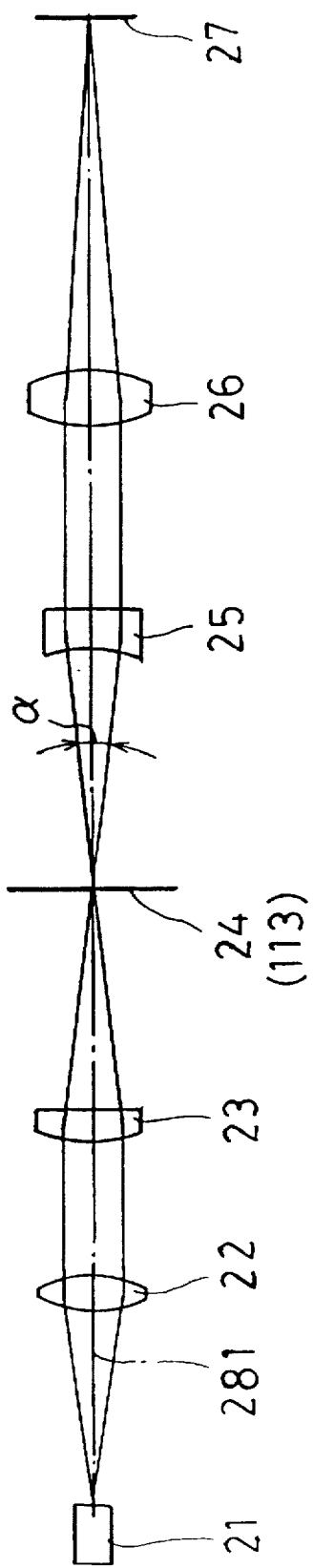
FIG. 39 shows an optical arrangement of a laser printer in a sub-scanning direction.

FIG. 39 is a sectional view of an optical arrangement of main elements of a laser printer in the sub-scanning direction. In FIG. 39, 21 designates the semiconductor laser or laser diode (LD), 22 the collimating lens, 23 the cylindrical lens, 24 the deflecting point by the polygonal mirror (reflecting surface 113), 25 the f θ lens, 26 the image forming lens system, and 27 the drawing (i.e., image formation) surface, respectively. The laser beam emitted from the LD 21 and including drawing (i.e., image formation) data is converged onto the deflecting point 24 to form an image and is converged again onto the drawing surface 27 to form an image.

In general, in the laser printer as shown in FIG. 39, a possible oscillation of the laser beams caused by the inclination of the reflecting surface 113 which defines the deflecting point 24 during the rotation of the polygonal mirror, 11 can be accepted, provided that the oscillation is within one-half the angle a (FIG. 39). In other words, it is necessary to restrict the oscillation of the bundle of beams within α/2 with the help of the mechanical rigidity of the polygonal mirror 111 and the reflecting surface 113 thereof. This means that in the arrangement shown in FIG. 39, the reflecting surface 113 must be precisely retained within an inclination angle of α/2 with respect to the direction parallel with the axis of the shaft 112 of the polygonal mirror during the rotation thereof.

Since the bundle of rays is converged onto one point (one line) of the reflecting surface 113, as can be seen in FIG. 39, the thickness of the polygonal mirror 111 (reflecting surface 113) in the form of a thin film can be, in theory, extremely thin, provided that a possible mounting error of the polygonal mirror 111 and a possible displacement of the deflection point can be absorbed. If a (numerical aperture N.A.)=1/80, and the polygonal mirror 111 is made of a parallelepiped whose diameter is 40 mm, the thickness of the polygonal mirror 111 (reflecting surface 113) can be, for example, 65 μm, taking into account a mounting error of ±10 μm.

In a conventional polygonal mirror which is made of aluminum, the polygonal mirror must be subject to a mirror grinding using a diamond tool to realize profile irregularity within 0.02 μm, thus resulting in an expensive polygonal mirror. To reduce the manufacturing cost, in the conventional production process, a number of thin polygonal mirrors are laminated and ground at one time. However, it was impossible to reduce the thickness of the polygonal mirror below 3 mm to obtain the mechanical strength strong enough to grind the same, and in view of the above-mentioned restriction concerning the oscillation of the bundle of beams within α/2. Whereas, in the present invention, in spite of the small thickness (50 to 100 μm) of the polygonal mirror 111, the polygonal mirror 111 can be positioned at a correct position during the rotation thereof. Consequently, not only can the material cost of the polygonal mirror be reduced, but also the cost for one mirror grinding operation can be considerably reduced. Moreover, since a high precision motor is not necessary, an inexpensive motor can be used.

Figure 40:
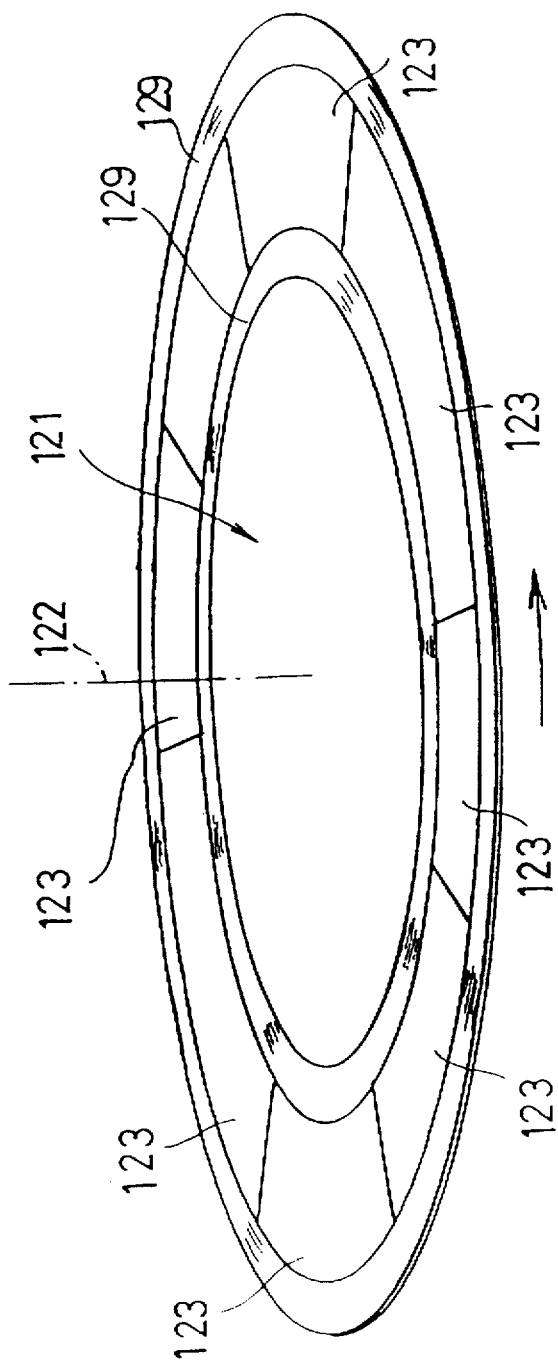
FIG. 40 is a perspective view of a hologram disc to which an optical scanner according to the present invention is applied.
Figure 41:
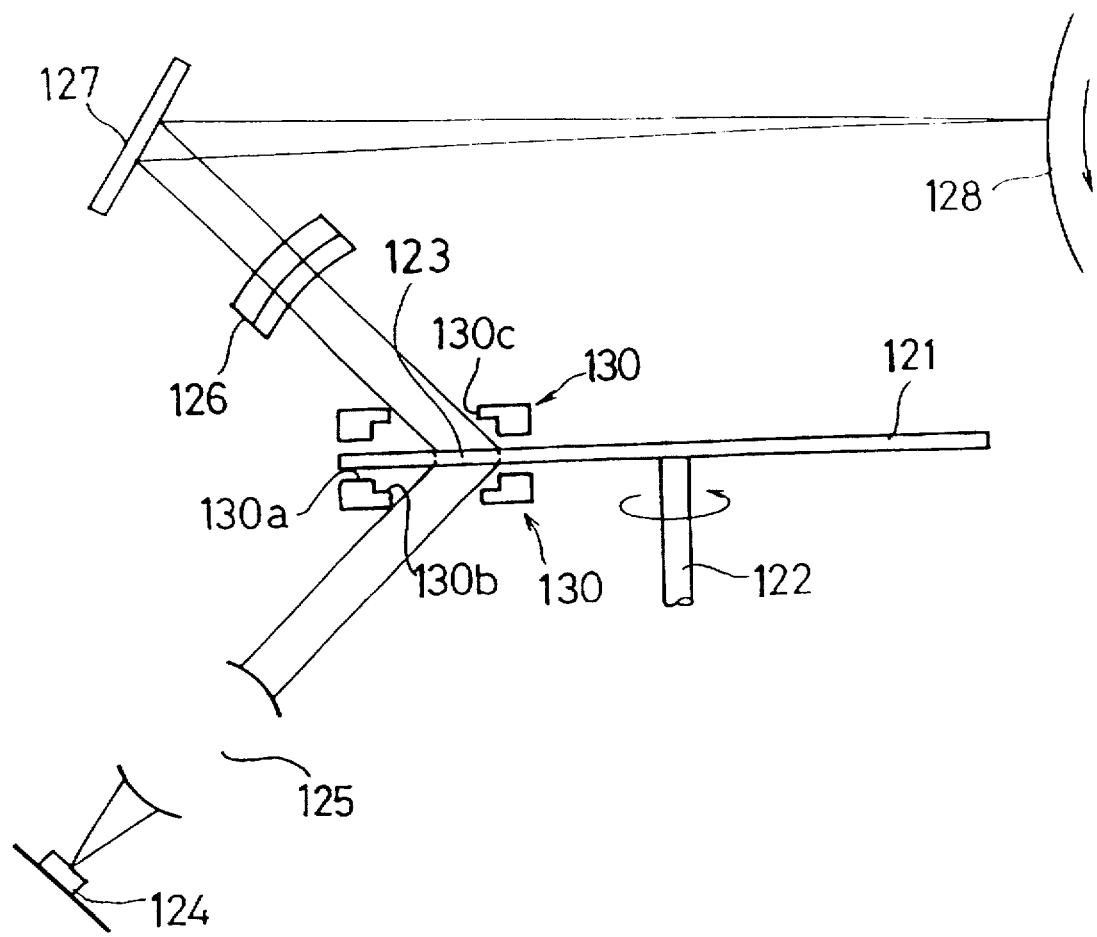
FIG. 41 is a conceptual view of an optical scanner shown in FIG. 40.

FIGS. 40 and 41 show conceptual views of an embodiment of the present invention applied to a beam scanner in which a hologram disc 121 is used as a light deflecting disc. The hologram disc 121 is provided with a plurality of identical hologram facets 123 (six facets in the illustrated embodiment) arranged in the circumferential direction of referring to FIG. 41, the disc. The laser light, emitted from the laser source 124 which is selectively turned ON and OFF in accordance with drawing data, is collimated by the collimating lens 125, and made incident upon the hologram facet 123 of the hologram disc 121 which is rotated about the shaft 122. The laser light is thereafter deflected by the hologram images (the hologram facets) 123, and converged onto the drawing surface (photosensitive drum) 128 through the imaging lens 126 and the reflecting mirror 127. The drawing surface 128 is moved, in the sub-scanning direction perpendicular to the main scanning direction of the laser beams, to draw a two-dimensional image on the drawing surface 128.

Beam scanners using a hologram disc have been used, for example, in a POS terminal system, and are being improved to be used for a laser printer in place of beam scanners using a polygonal mirror. One of the problems to be solved in such a beam scanner using a hologram disc is an easy positioning of the hologram disc.

Figure 42:
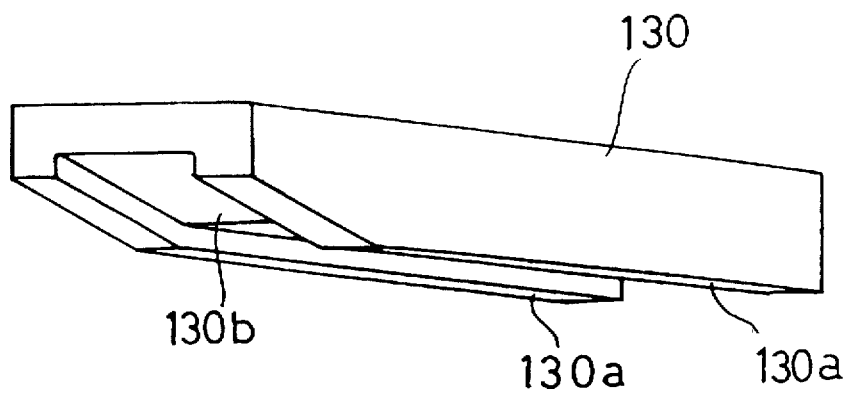
FIG. 42 is a perspective view of an example of a positioning element shown in FIG. 41.
Figure 43:
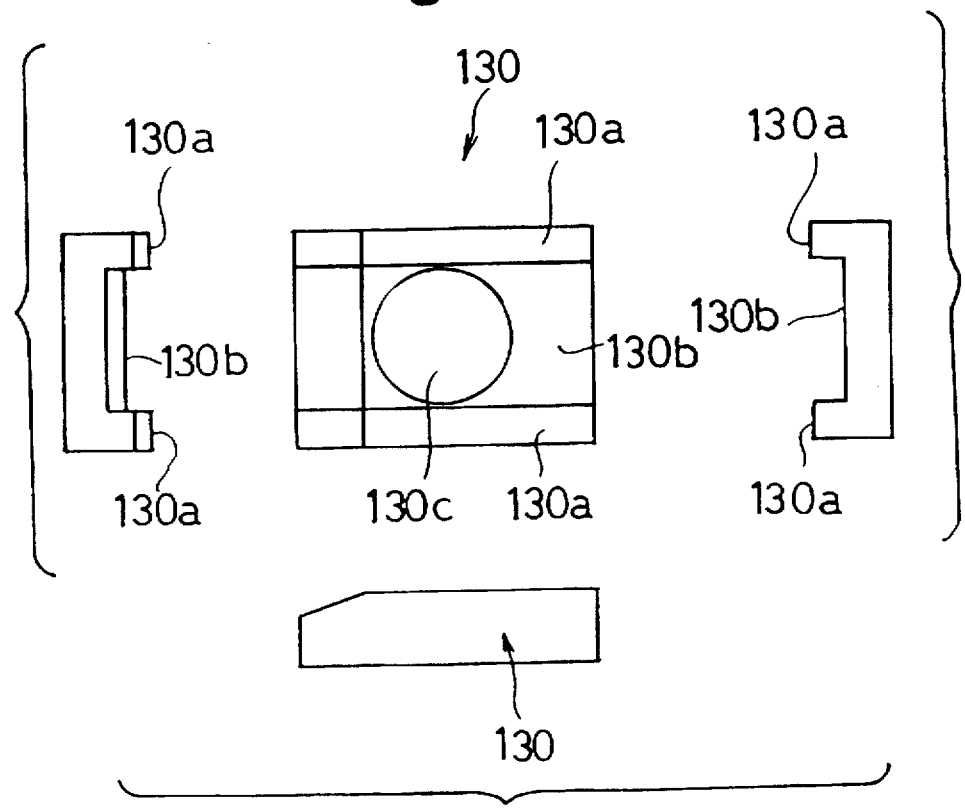
FIG. 43 is a view of a positioning element shown in FIG. 41, including a plan view, right and left side elevational views and a bottom view thereof.

In the embodiment illustrated in FIG. 40, a pair of inner and outer annular track surfaces 129 are provided concentrically to the axis of rotation of the shaft 122 of the hologram disc 121 on the front and back surfaces of the hologram disc 121 to surround the hologram facets 123. A pair of positioning elements 130 are provided to correspond to the inner and outer annular track surfaces 129. The positioning elements 130, as shown in FIGS. 42 and 43, are each provided with a pair of flat surfaces 130a corresponding to the inner and outer annular track surfaces 129, and a recess 130b formed between the flat surfaces 130a so as not to interfere with the hologram facet 123. The inclination direction of the positioning elements 130 is identical to that of the positioning elements 41 shown in FIG. 38. The positioning elements 130 are each provided with a through hole 130c through which the laser light passes. If the positioning elements 130 are made of a transparent material, no through hole 130c is necessary.

The embodiment illustrated in FIG. 40 differs from the embodiment illustrated in FIG. 38 in the point that the hologram facet 123 which constitute the light deflecting surfaces (portions) are provided on both the front and back surfaces of the hologram disc 121, and that the annular track surfaces 129 are provided on both sides of each of the hologram facets 123 on the front and back surfaces of the hologram disc 121 as shown in FIG. 40. Nevertheless, the basic operation of the embodiment illustrated in FIG. 40 is identical to that of the embodiment illustrated in FIG. 38. Namely, when the hologram disc 121 is rotated, the fluid flows are produced between the annular track surfaces 129 and the corresponding positioning elements 123, so that the hologram disc 121 can be stably and correctly held within a plane.

Figure 44:
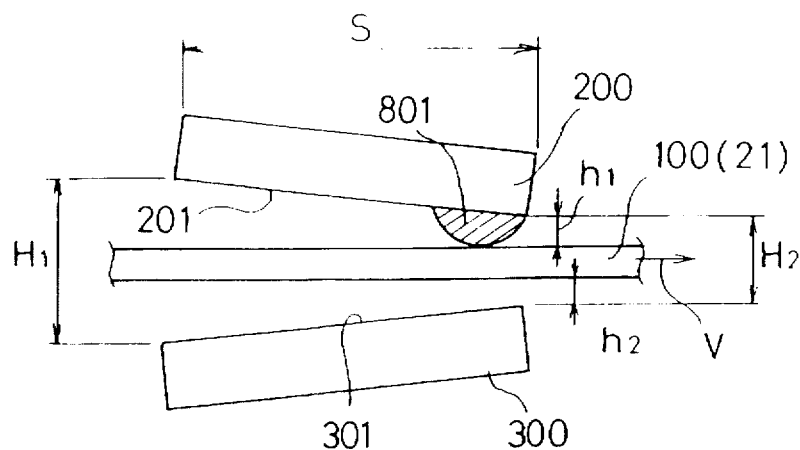
FIG. 44 is a side elevational view of another embodiment of an optical scanner, according to the present invention.

FIG. 44 shows another embodiment of the present invention. As mentioned before with reference to FIGS. 1 and 2, when a pair of stationary members (positioning elements) 200, 300 having oblique surfaces (opposed surfaces) 201 and 301 are provided on the upper and lower sides of the moving surface 100, the moving surface 100 is stably held within a plane due to the fluid forces which are substantially in inverse proportion to the distances h1 and h2 therebetween. However, assuming that the moving surface 100 is a deformed hologram disc 21, there is a possibility that an oscillation of the hologram disc whose amplitude is smaller than h1 or h2 with respect to a position in which the fluid forces are balanced occurs. If such oscillation occurs, the positioning precision is reduced. It is possible to damp the oscillation to some extent by decreasing the distances h1 and h2. However, where the distances h1 and h2 are small, the air resistance increases, thus necessitating an increased drive power for the motor to rotate the hologram disc. Moreover, the hologram disc can be easily damaged by dust or foreign matter if it were to be driven at high air pressure.

The embodiment illustrated in FIG. 44 is mainly aimed at the prevention of the occurrence of an oscillation of the hologram disc, as mentioned above, particularly in the case of a deformed hologram disc. To this end, the upper stationary member (positioning element) 200 has on the oblique surface 201 a projection (contact portion) 801 having a smooth round surface which mechanically comes into contact with the hologram disc 21. The pressure caused by the sliding contact between the contact portion 801 and the hologram disc 21 is much larger than the fluid force. Furthermore, if the surface of the contact portion 801 is smooth, the frictional resistance to the movement of the moving surface 100 (i.e., hologram disc 21) is small. The smooth contact portion 801 can be replaced with a rotor or roller, such as a radial bearing or the like.

Figure 45:
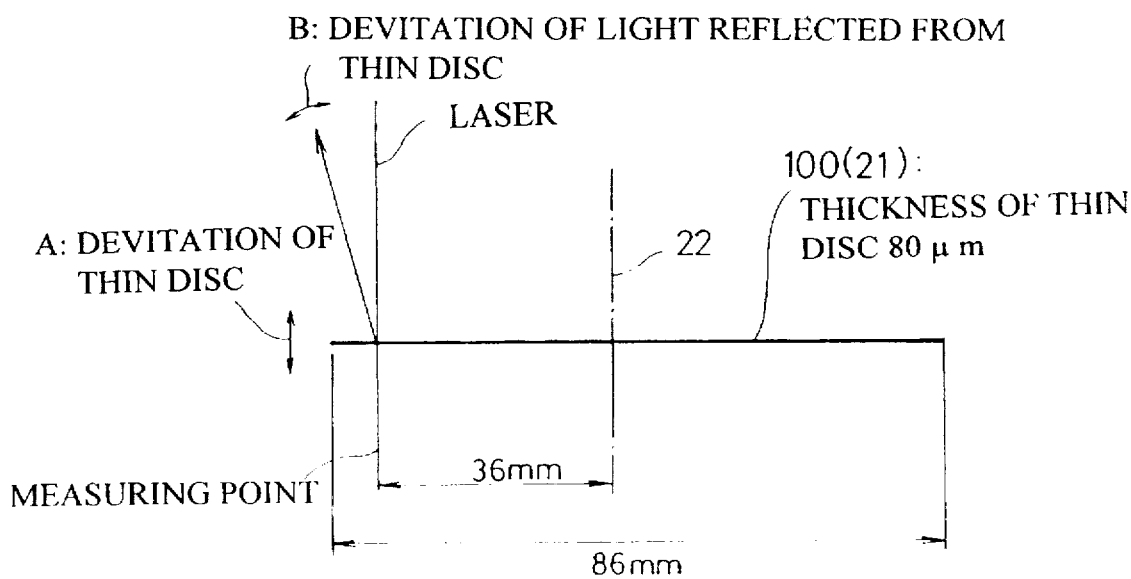
FIG. 45 is a schematic view of an experimental device which is used to confirm the technical effect of the present invention.

FIG. 45 shows the experimental results of a damping effect of the oscillation, depending on the absence or presence of the contact portion 801. In the experiments, the hologram disc 21 made of a polyester substrate, whose thickness and diameter were 80 μm and 86 mm respectively, was used as the moving member 100. The hologram disc 21 was deformed along a line located at a distance of about 15 mm from the axis of the shaft 122, so that there was a deviation of about 1 mm at the peripheral edge of the hologram disc 21. The hologram disc 21 was rotated about the shaft 122 at 100 rps (revolution per second). The deviation (width or amplitude of oscillation) "a" of the hologram disc at the peripheral edge and the angle "b" of the deviation (oscillation) of light reflected from the hologram disc when the laser light is made incident upon the hologram disc at a point 36 mm from the axis of the shaft 122 were measured.

The experiments were conducted for three cases: In Case (I), there was neither the stationary member (positioning element) 200 nor the positioning element 300 shown in FIG. 44 present; in case(II), both the stationary member (positioning element) 200 and the positioning element 300 shown in FIG. 44 were present; and in case(III) the stationary member (positioning element) 200 was inclined so that the lower end came into contact with the hologram disc 21. The lengths "s" (FIG. 44) and the distances "H1" and "H2" (FIG. 44) of the upstream and downstream sides between the positioning elements 200 and 300 were 10 mm, 550 μm, and 250 μm, respectively. The oblique surfaces 201 and 301 of the positioning elements 200 and 300 were both made of polished glass surfaces whose roughness was 0.03 μPV. The experimental results are shown in Table 1 below.

TABLE 1

|  | Case (I) | Case (II) | Case (III) |
| --- | --- | --- | --- |
| Deviation "a" | 0.5 mm | N/M | N/M |
| Angle "b" | 4.6° | 0.57° | 0.08° |

N/M = Not Measured because the instrument to be used for measuring would detrimentally interfere with the fluid flow.

Note that since the deviation (amplitude of oscillation) "a" depends on the air flow, no measuring device is accessible without interfering with said air flow, and accordingly, the value of "a" was visually measured. Case (III) is equivalent to the embodiment in which the contact portion 801 is provided on the positioning element 200 as shown in FIG. 44.

As can be seen from the experimental results, the oscillation can be damped by the presence of the contact portion 801 provided on the stationary member 200 or the positioning element 300. If the positioning of the hologram disc is carried out only by the mechanical contact pressure without utilizing the fluid pressure, the resistance force to the moving member (hologram disc) would be 65 times larger [i.e., $(4.6/0.57)^2$=65 times larger], assuming that the resistance force is simply in proportion to the square of the oscillation angle. However, in the present invention, since both the mechanical contact pressure and the fluid pressure are utilized in combination, there is only a small increase of approximately 1/65th of the resistance force. According to the present invention, a simple and inexpensive positioning apparatus for an optical deflector, which requires no additional complex device and which prevents the optical element from being damaged, can be achieved.

Figure 46:
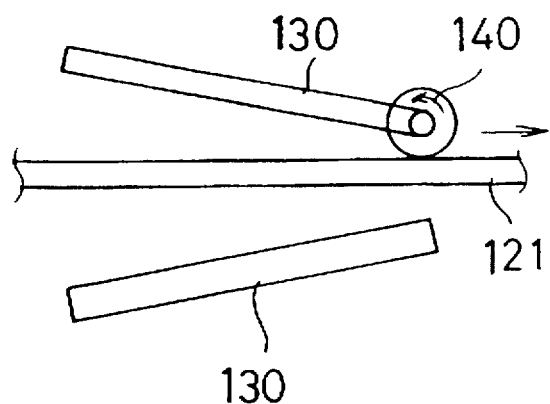
FIG. 46 is a side elevational view of still another embodiment of an optical scanner, according to the present invention; and, FIG. 47 is a plan view of FIG. 46.
Figure 47:
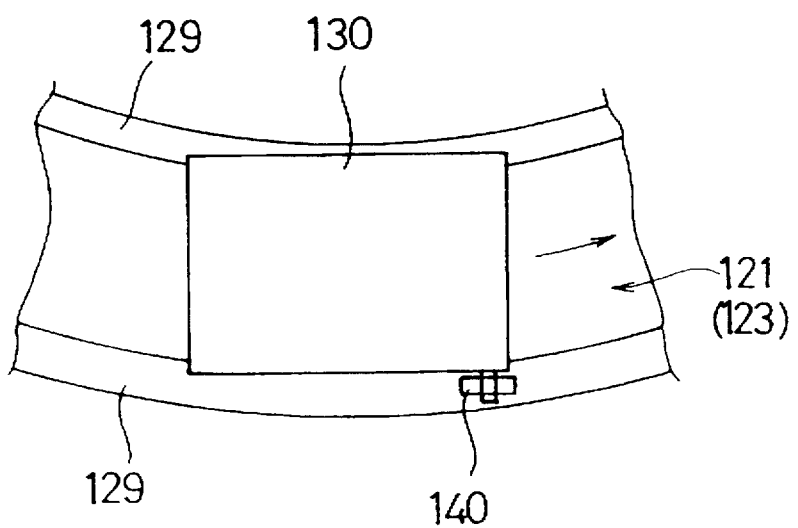

FIGS. 46 and 47 show an example of a hologram disc 121 having inner and outer annular track surfaces 129 provided on both sides of the hologram images 123, wherein a rotary contact member (roller) 140 comes into contact with the outer track surface. The annular track members 129 are supported on one of the positioning elements 130 provided above and below the hologram disc 121. The positioning elements 130 can each be provided with oblique surfaces (opposed surfaces) 130a, a center recess 130b between the oblique surfaces, and a through hole 130c, similar to the embodiment shown in FIGS. 42 and 43.

Although the annular track surfaces are separate from the deflecting portion (reflecting surface 12a 113, the hologram facets 123) in the above-mentioned embodiments, it is possible to have the annular track surfaces as part of the deflecting portion of the disc, if a relatively coarse positioning of the disc is acceptable or the moving speed of the disc is high thus giving an increase in the air pressure, etc.

As can be understood from the above discussion, according to the present invention, even if a rotatable deflecting disc is thin and flexible, the degree of flatness of the deflecting disc during the rotation can be remarkably increased. Namely, the deflecting disc can be accurately held within a plane while being spun. Furthermore, a rotatable multi-mirror in the form of a thin film can be used as the optical deflector.

I claim:

1. An optical scanner, comprising:
    a thin film light deflecting disc, said light deflecting disc having annular track surfaces provided on a front of said light deflecting disc and on a back of said light deflecting disc, said light deflecting disc being rotatable about an axis and concentric to said axis; and
    a pair of position elements opposed to said track surfaces to produce a first fluid force and an opposing second fluid force between said pair of positioning elements and said track surfaces without contacting said light deflecting disc when said light deflecting disc is rotated so that said light deflecting disc is position within a predetermined plane at a position where said first fluid force is balanced by said second fluid force and a gravitation force exerted on a corresponding portion of said light deflecting disc.

2. An optical scanner according to claim 1, said light deflecting disc comprising a rotatable multi-mirror which is provided on a peripheral surface thereof with a plurality of reflecting surfaces.

3. An optical scanner according to claim 2, said light deflecting disc comprising a hologram disc which is provided with a plurality of hologram facets divided in a circumferential direction.

4. An optical scanner according to claim 3, said annular track surfaces comprising a pair of inner and outer annular track surfaces which are concentrically provided on inner and outer sides of said hologram disc.

5. An optical scanner according to claim 2, one of said positioning elements being provided with a contact portion which comes into contact with said annular track surfaces.

6. An optical scanner according to claim 2, said annular track surfaces being provided separately from said light deflecting portion of said light deflecting disc.

7. An optical scanner according to claim 2, said annular track surfaces and a light deflecting portion of said light deflecting disc being provided on a common element.

8. An optical recording and reproducing apparatus, comprising:
    a flexible thin film optical element without a backing structure;
    recording and reproducing means for recording information onto said flexible thin film optical element and reproducing said information from said flexible thin film optical element using a laser light focused onto said flexible thin film optical element;
    at least one positioning element having a surface opposed to said flexible thin film optical element; and
    moving means for moving at least one of said flexible thin film optical element and said opposed surface of said positioning element in a direction parallel with a plane of said flexible thin film optical elements,
    said opposed surface of said positioning element defining a positioning surface which produces a fluid force without contacting said flexible thin film optical element when said moving means moves at least one of said flexible thin film optical element and said opposed surface of said positioning element, so as to hold said flexible thin film optical element in a predetermined plane at a predetermined position where said fluid force i balanced by an opposing fluid force and a gravitational pressure exerted on a corresponding portion of said optical element.

9. An optical recording and reproducing apparatus according to claim 8, said then film optical element comprising a circular disc.

10. A positioning apparatus for a flexible optical element in a form of a thin film, comprising:
    means for holding at least a part of said flexible optical element in a predetermined plane, said holding means comprising:
    a first element having a first surface opposed to said flexible optical element; and
    a second element having a second surface opposed to said flexible optical element, said first element, and said second element being positioned opposite to each other with respect to said flexible optical element; and
    means for moving at least one of said flexible optical element and said holding means relative to each other in a direction parallel to a plane of said flexible optical element said holding means being positioned, with respect to said flexible optical element, such that a first fluid force is generated by said first surface between said first surface and said flexible optical element with said first surface not contacting said flexible optical element and a second fluid force is generated by said second surface between said second surface and said flexible optical element with said second surface not contacting said flexible optical element, when said moving means moves said at least one of said flexible optical element and said holding means, said first fluid force producing a first pressure that urges said flexible optical element towards said second surface and said second fluid force producing a second pressure that urges said flexible optical element towards said first surface, so as to hold said at least a part of said flexible optical element in said predetermined plane at a position where said first pressure is balanced t i said second pressure and a gravitational pressure exerted on a corresponding portion of said optical element.

11. A positioning apparatus according to claim 10, said moving means moving said optical element, said holding means being stationary.

12. A positioning apparatus according to claim 11, said optical element in the form of a thin film being rotatable about an axis.

13. A positioning apparatus according to claim 11, said holding means comprising an annular ring concentric to said optical element.

14. A positioning apparatus according to claim 10, said optical element being stationary, said holding means comprising a rotatable cylinder having an axis of rotation extending parallel with a plane of said optical element.

15. A positioning apparatus according to claim 10, said holding means being provided with oblique surfaces that are inclined such that a distance between said oblique surfaces and said optical element decreases towards leading ends, as viewed in a direction of movement of said optical element.

16. A positioning apparatus according to claim 10, said holding means being made of an optically transparent material.

17. A holding means according to claim 16, said positioning element comprising an optical lens.

18. A positioning apparatus according to claim 10, said holding means comprising an optical element.

19. A positioning apparatus according to claim 18, said optical element comprising a mirror.

20. A positioning apparatus according to claim 10, said holding means comprising a magnetic element.

21. A positioning apparatus according to claim 10, said optical element comprising one of the following: a hologram element, a lens, a mirror, or a beam splitter.

22. A positioning apparatus according to claim 10, said optical element comprising a circular disc.

23. A positioning apparatus according to claim 10, said optical element being shaped cylindrically.

24. A positioning apparatus according to claim 10, wherein said first element and said second element comprise annular rings having different diameters.

25. A positioning apparatus according to claim 24, wherein said annular rings are provided above and below said optical element.

26. An apparatus for positioning a flexible thin film optical element, comprising:

a holding element having a surface for holding at least a portion of said optical element in a predetermined horizontal plane, said holding element being positioned below said optical element in reference to gravity with said surface opposed to said optical element; and mean s for moving one of said optical element and said holding element relative to the other of said optical element and s aid holding element in a direction parallel to a plane of said optical element, said holding element being positioned, with respect to said optical element, such that a fluid force is generated by said surface between said surface and said optical element with said surface not contacting said optical element when said moving means moves said one of said optical element and said holding element, said fluid force producing a pressure that exerts an upward force on said optical element so as to hold said at least a portion of said optical element in said predetermined plane at a position where said pressure is balanced by a gravitational pressure exerted on a corresponding portion of said optical element.

27. A positioning apparatus according to claim 26, said holding element being shaped such that said optical element is held at a predetermined position by a balance of gravity acting on said optical element and said fluid force.

28. The apparatus of claim 26, wherein said holding element has a shape for producing a positive pressure.

29. The apparatus of claim 26, wherein said holding element includes a shallow groove.

30. The apparatus of claim 26, wherein said optical element comprises a circular disc.

31. An apparatus for positioning a flexible thin film optical element, comprising:

a holding element having a surface for holding at least a portion of said optical element in a predetermined horizontal plane, said holding element being positioned above said optical element in reference to gravity with said surface opposed to said optical element; and means for moving one of said optical element and said holding element relative to the other of said optical element and said holding element in a direction parallel to a plane of said optical element, said surface including a first surface portion and a second surface portion that are formed such that a positive fluid force is generated by said first surface portion between said first surface portion and said optical element with said first surface portion not contacting said optical element and a negative fluid force is generated by said second surface portion between said second surface portion and said optical element with said second surface portion not contacting said optical element, when said moving means moves said one of said optical element and said holding element, said positive fluid force producing a positive pressure that exerts a downward force on said optical element, said negative fluid force producing a negative pressure that draws said optical element towards said second surface portion, so as to hold said at least a portion of said optical element in said predetermined plane at a position where said negative pressure is balanced by said positive pressure and a gravitational pressure exerted on a corresponding portion of said optical element.

32. A positioning apparatus according to claim 31, said first surface portion of said holding element being shaped to produce said positive pressure.

33. A positioning apparatus according to claim 31, said second surface portion of said holding element being shaped to produce said negative pressure.

34. The apparatus of claim 31, said holding element including a shallow groove.

35. The apparatus of claim 34, wherein said shallow groove has a shape for producing a negative pressure.

36. The apparatus of claim 31, wherein said optical element moves.

37. The apparatus of claim 31, wherein said holding element moves.

* * * * *